United States Patent
Stirling-Gallacher et al.

(10) Patent No.: US 10,148,332 B2
(45) Date of Patent: Dec. 4, 2018

(54) SYSTEM AND METHOD FOR MULTI-LEVEL BEAMFORMED NON-ORTHOGONAL MULTIPLE ACCESS COMMUNICATIONS

(71) Applicant: Futurewei Technologies, Inc., Plano, TX (US)

(72) Inventors: Richard Stirling-Gallacher, San Diego, CA (US); Bin Liu, San Diego, CA (US); Lili Zhang, Beijing (CN)

(73) Assignee: Futurewei Technologies, Inc., Plano, TX (US)

( * ) Notice: Subject to any disclaimer, the term of this patent is extended or adjusted under 35 U.S.C. 154(b) by 195 days.

(21) Appl. No.: 14/724,716

(22) Filed: May 28, 2015

(65) Prior Publication Data

US 2016/0353424 A1   Dec. 1, 2016

(51) Int. Cl.
*H04B 7/06* (2006.01)

(52) U.S. Cl.
CPC ......... *H04B 7/0626* (2013.01); *H04B 7/0617* (2013.01); *H04B 7/063* (2013.01);
(Continued)

(58) Field of Classification Search
CPC .... H04B 7/0626; H04B 7/0495; H04B 7/063; H04B 1/7103; H04B 1/71;
(Continued)

(56) References Cited

U.S. PATENT DOCUMENTS

| | | | |
|---|---|---|---|
| 2006/0286974 A1* | 12/2006 | Gore | H04W 16/00 455/422.1 |
| 2010/0033374 A1* | 2/2010 | van Rensburg | H01Q 1/246 342/368 |

(Continued)

FOREIGN PATENT DOCUMENTS

| | | |
|---|---|---|
| CN | 104349491 A | 2/2015 |
| EP | 2882123 A1 | 6/2015 |

(Continued)

OTHER PUBLICATIONS

"IEEE Standard for Information technology—Telecommunications and information exchange between systems Local and metropolitan area networks—Specific Requirements; Part 11: Wireless LAN Medium Access Control (MAC) and Physical (PHY) Specifications, Amendment 3: Enhancements for Very High Throughput in the 60 GHz Band," IEEE Std 802.11ad-2012, IEEE Computer Society, Dec. 28, 2012, 628 pages.

(Continued)

*Primary Examiner* — Habte Mered
(74) *Attorney, Agent, or Firm* — David Roe

(57) ABSTRACT

A method for operating a communications controller includes grouping a plurality of user equipments (UEs) in accordance with received channel condition reports, UE interference cancellation (IC) capability reports, and mobility estimates, thereby producing information about the grouping, selecting a first UE out of the plurality of UEs and a second UE out of the plurality of UEs, wherein the selecting is in accordance with the information about grouping, wherein a wide width beam is allocated to the first UE and a narrow width beam is allocated to the second UE, and wherein the wide width beam and the narrow width beam spatially overlap, co-scheduling resources of a first transmit block to the first UE and the second UE, determining first transmission parameters for the first UE and second transmission parameters for the second UE in accordance with the co-scheduled resources, and communicating with the first UE and the second UE in accordance with the first transmission parameters for the first UE and the second transmission parameters for the second UE.

22 Claims, 20 Drawing Sheets

(52) U.S. Cl.
CPC .......... *H04B 7/0628* (2013.01); *H04B 7/0632* (2013.01); *H04B 7/0639* (2013.01); *H04B 7/0695* (2013.01)

(58) Field of Classification Search
CPC .......... H04B 2001/1045; H04B 7/0617; H04B 7/0628; H04B 7/0632; H04B 7/0639; H04B 7/0695; Y02B 60/50
See application file for complete search history.

(56) References Cited

U.S. PATENT DOCUMENTS

| | | | |
|---|---|---|---|
| 2010/0303034 A1* | 12/2010 | Chen | H04L 5/0023 370/329 |
| 2012/0282864 A1 | 11/2012 | Dimou et al. | |
| 2013/0057432 A1* | 3/2013 | Rajagopal | H01Q 25/002 342/368 |
| 2013/0286960 A1 | 10/2013 | Li et al. | |
| 2014/0044091 A1 | 2/2014 | Kishiyama | |
| 2014/0050279 A1 | 2/2014 | Kishiyama | |
| 2014/0241273 A1* | 8/2014 | Kim | H04J 11/005 370/329 |
| 2014/0256341 A1* | 9/2014 | Nayeb Nazar | H04J 11/0023 455/452.1 |
| 2014/0314006 A1* | 10/2014 | Suh | H04B 7/0626 370/329 |
| 2015/0036621 A1* | 2/2015 | Shin | H04J 11/0036 370/329 |
| 2015/0099527 A1 | 4/2015 | Zhuang | |
| 2016/0021565 A1* | 1/2016 | Kim | H04L 5/005 370/329 |
| 2016/0080963 A1* | 3/2016 | Marinier | H04L 5/0053 370/252 |
| 2016/0119936 A1* | 4/2016 | Kim | H04J 11/0053 370/329 |
| 2016/0135194 A1* | 5/2016 | Kim | H04L 5/0057 370/329 |
| 2016/0149679 A1* | 5/2016 | Frenne | H04L 5/005 370/329 |
| 2016/0183275 A1* | 6/2016 | Inoue | H04B 7/0695 455/450 |
| 2016/0227521 A1 | 8/2016 | Han et al. | |
| 2016/0227559 A1* | 8/2016 | Schober | H04W 72/1231 |
| 2016/0249358 A1* | 8/2016 | Li | H04W 72/0453 |
| 2016/0261325 A1 | 9/2016 | Ko et al. | |
| 2016/0345216 A1* | 11/2016 | Kishiyama | H04W 36/0083 |

FOREIGN PATENT DOCUMENTS

| | | |
|---|---|---|
| EP | 3016428 A1 | 5/2016 |
| WO | 2013165149 A1 | 11/2013 |
| WO | 2014021008 A1 | 2/2014 |
| WO | 2014122994 A1 | 8/2014 |
| WO | 2015024205 A1 | 2/2015 |
| WO | 2015060756 A1 | 4/2015 |
| WO | 2015065157 A1 | 5/2015 |

OTHER PUBLICATIONS

"IEEE Standard for Information technology—Telecommunications and information exchange between systems—Local and metropolitan area networks—Specific requirements; Part 15.3: Wireless Medium Access Control (MAC) and Physical Layer (PHY) Specifications for High Rate Wireless Personal Area Networks (WPANs); Amendment 2: Millimeter-wave-based Alternative Physical Layer Extension," IEEE Std. 802.15.3c-2009, IEEE Computer Society, Oct. 12, 2009, 203 pages.

Benjebbour, A., et al., "Concept and Practical Considerations of Non-orthogonal Multiple Access (NOMA) for Future Radio Access," Intelligent Signal Processing and Communications Systems, Nov. 12-15, 2013, pp. 770-774.

Benjebbour, A., et al., "System-Level Performance of Downlink NOMA for Future LTE Enhancements," Globecom Workshops, Dec. 9-13, 2013, pp. 66-70.

Hur, S., et al., "Multilevel Millimeter Wave Beamforming for Wireless Backhaul," Globecom Workshops, Dec. 5-9, 2011, pp. 253-257.

Lan, Y., et al., "Efficient and Dynamic Fractional Frequency Reuse for Downlink Non-orthogonal Multiple Access," Vehicular Technology Conference, May 18-21, 2014, pp. 1-5.

Wang, J., et al., "Beam Codebook Based Beamforming Protocol for Multi-Gbps Millimeter-Wave WPAN Systems," IEEE Journal on Selected Areas in Communications, vol. 27, No. 8, Oct. 2009, pp. 1390-1399.

* cited by examiner (a) Quasi-omni pattern (b) Sector (c) Beam

ASSUMING CSI-RS HAS 8 DEGREE HPBW

=> 15 BEAMS PER 120 DEGREE SECTOR

ASSUMING UE ALSO HAS 4 BEAMS, THE UE POTENTIALLY HAS TO EVALUATE 60 CSI-RS BEAM-COMBINATIONS

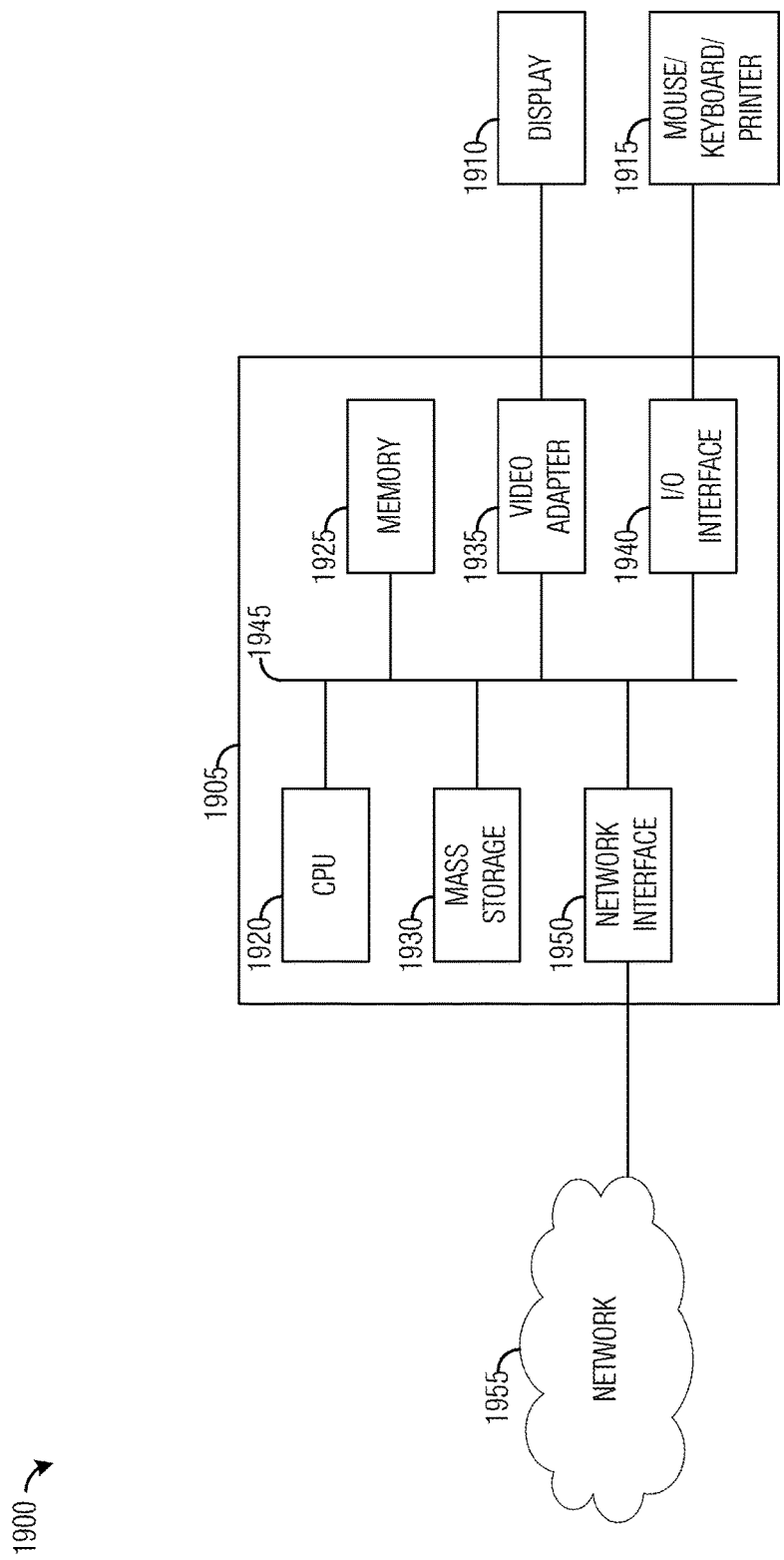

SYSTEM AND METHOD FOR MULTI-LEVEL BEAMFORMED NON-ORTHOGONAL MULTIPLE ACCESS COMMUNICATIONS

TECHNICAL FIELD

The present disclosure relates generally to digital communications, and more particularly to a system and method for multi-level beamformed non-orthogonal multiple access (NOMA) communications.

BACKGROUND

In millimeter wave (mmWave) communications, beamforming has been used to overcome the expected path losses. Depending upon the path loss between an evolved NodeB (eNB) and a user equipment (UE), different levels of beamforming gain may be needed for transmitting data on different eNB to UE links. A simplifying solution is to fix the beamforming gain to its maximum value to satisfy the worst case path loss. A drawback of this simplistic approach is that transmission beams with maximum beamforming gain typically have very narrow beam width, which can be sensitive to UE mobility and blockages.

SUMMARY OF THE DISCLOSURE

Example embodiments of the present disclosure provide a system and method for multi-level beamformed non-orthogonal multiple access (NOMA) communications.

In accordance with an example embodiment of the present disclosure, a method for operating a communications controller is provided. The method includes grouping, by the communications controller, a plurality of user equipments (UEs) in accordance with received channel condition reports, UE interference cancellation (IC) capability reports, and mobility estimates, thereby producing information about the grouping, selecting, by the communications controller, a first UE out of the plurality of UEs and a second UE out of the plurality of UEs, wherein the selecting is in accordance with the information about grouping, wherein a wide width beam is allocated to the first UE and a narrow width beam is allocated to the second UE, and wherein the wide width beam and the narrow width beam spatially overlap, co-scheduling, by the communications controller, resources of a first transmit block to the first UE and the second UE, determining, by the communications controller, first transmission parameters for the first UE and second transmission parameters for the second UE in accordance with the co-scheduled resources, and communicating, by the communications controller, with the first UE and the second UE in accordance with the first transmission parameters for the first UE and the second transmission parameters for the second UE.

In accordance with another example embodiment of the present disclosure, a method for operating a communications device is provided. The method includes receiving, by the communications device, a plurality of beamformed channel state information reference signals (CSI-RS), determining, by the communications device, a channel condition report in accordance with the plurality of received CSI-RS, sending, by the communications device, the channel condition report to a communications controller, receiving, by the communications device, transmission parameters from the communications controller, wherein the transmission parameters are selected in accordance with the channel condition report and mobility estimate, and wherein the transmission parameters include locations of a first demodulation reference signal (DMRS) resource assigned to the communications device and a second DMRS resource assigned to a co-scheduled communications device, measuring, by the communications device, a received signal power at a location of the second DMRS resource, and configuring, by the communications device, an interference cancellation receiver in accordance with the received signal power measurement.

In accordance with another example embodiment of the present disclosure, a communications controller is provided. The communications controller includes a processor, and a computer readable storage medium storing programming for execution by the processor. The programming including instructions to group a plurality of user equipments (UEs) in accordance with received channel condition reports, UE interference cancellation (IC) capability reports and mobility estimates, thereby producing information about groups of UEs, select a first UE out of the plurality of UEs and a second UE out of the plurality of UEs, wherein the first UE is selected is in accordance with the information about grouping, wherein a wide width beam is allocated to the first UE and a narrow width beam is allocated to the second UE, and wherein the wide width beam and the narrow width beam spatially overlap, co-schedule resources of a first transmit block to the first UE and the second UE, determine first transmission parameters for the first UE and second transmission parameters for the second UE in accordance with the co-scheduled resources, and communicate with the first UE and the second UE in accordance with the first transmission parameters for the first UE and the second transmission parameters for the second UE.

Practice of the foregoing embodiments enables UEs to be allocated different beam widths and/or beam levels and facilitates the co-scheduling of multiple UEs with different beam levels, thereby increasing spectral efficiency since multiple UEs can be co-scheduled at the same time. Link robustness is also increased since UEs that are closer to the eNB and/or those UEs with high mobility can be allocated transmission beams with wider beam widths, thereby providing greater link robustness.

Moreover, hardware resources at the eNB may be more optimally utilized since co-scheduled UEs can use subsets of the same hardware at the same time. Therefore, lower complexity eNBs with reduced power consumption and lower cost can support more UEs.

BRIEF DESCRIPTION OF THE DRAWINGS

For a more complete understanding of the present disclosure, and the advantages thereof, reference is now made to the following descriptions taken in conjunction with the accompanying drawing, in which:

FIG. 19 is a block diagram of a processing system that may be used for implementing the devices and methods disclosed herein.

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

One embodiment of the disclosure relates to multi-level beamformed non-orthogonal multiple access (NOMA) communications. For example, a communications controller groups a plurality of user equipments (UEs) in accordance with received channel condition reports, UE interference cancellation (IC) capability reports, and mobility estimates, thereby producing information about the grouping, selects a first UE out of the plurality of UEs and a second UE out of the plurality of UEs, wherein the selecting is in accordance with the information about grouping, wherein a wide width beam is allocated to the first UE and a narrow width beam is allocated to the second UE, and wherein the wide width beam and the narrow width beam spatially overlap, co-schedules resources of a first transmit block to the first UE and the second UE, determining first transmission parameters for the first UE and second transmission parameters for the second UE in accordance with the co-scheduled resources, and communicates with the first UE and the second UE in accordance with the first transmission parameters for the first UE and the second transmission parameters for the second UE.

The present disclosure will be described with respect to example embodiments in a specific context, namely communications systems that use multi-level beamformed NOMA communications techniques. The disclosure may be applied to standards compliant communications systems, such as those that are compliant with Third Generation Partnership Project (3GPP), IEEE 802.11, and the like, technical standards, and non-standards compliant communications systems, that use multi-level beamformed NOMA communications techniques.

Figure 1:
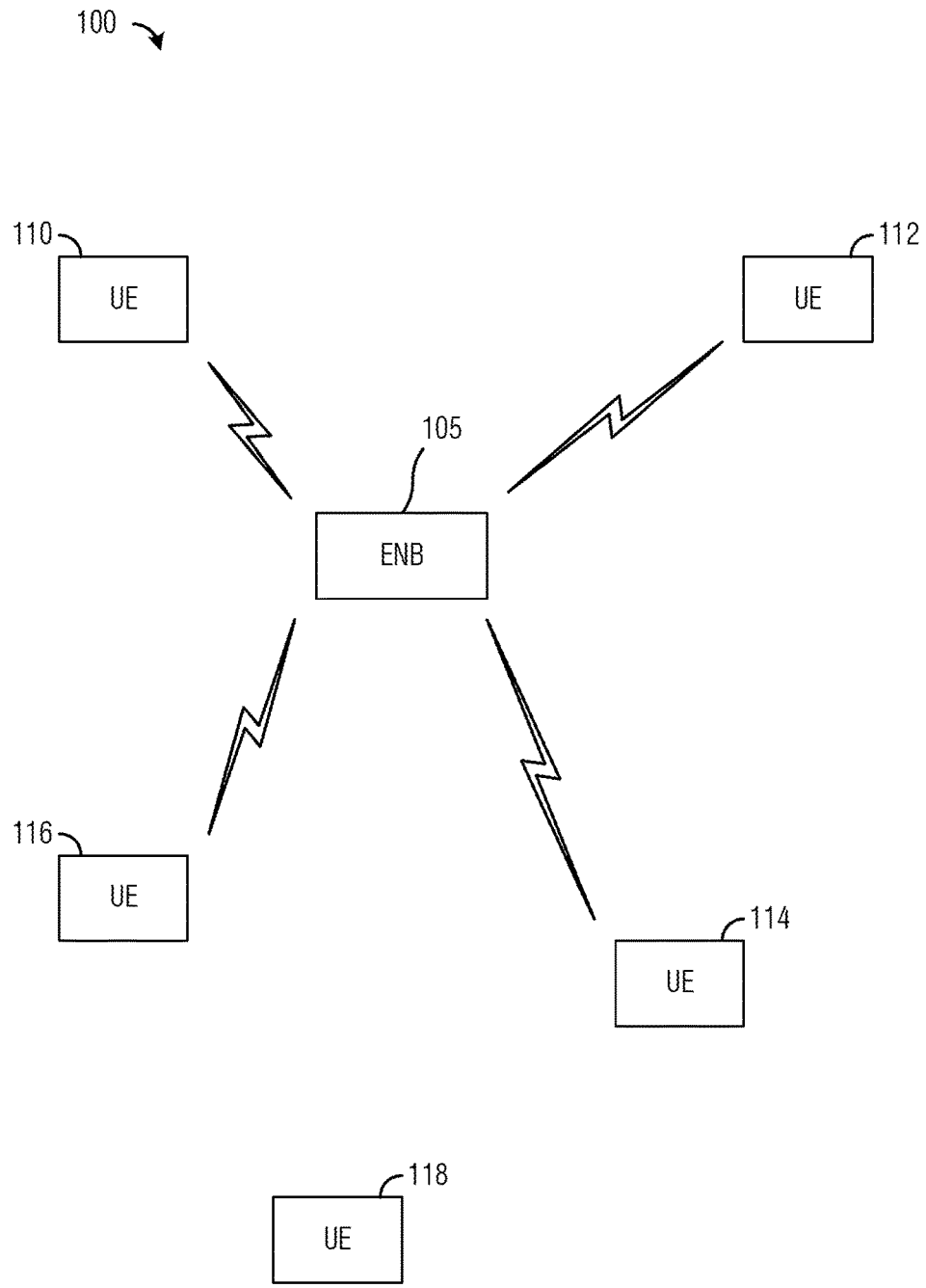
FIG. 1 illustrates an example communications system according to example embodiments described herein.

FIG. 1 illustrates an example communications system 100. Communications system 100 includes an evolved NodeB (eNB) 105 serving a plurality of user equipments (UEs), such as UE 110, 112, 114, and 116. In a first operating mode, transmissions for UEs as well as transmissions by UEs pass through eNB 105. eNB 105 allocates communications resources for the transmissions to or from the UEs. eNBs may also be commonly referred to as base stations, NodeBs, transmission points, remote radio heads, or access points, and the like, while UEs may also be commonly referred to as mobiles, mobile stations, terminals, subscribers, users, and the like. Communications resources may be time resources, frequency resources, code resources, time-frequency resources, and the like.

While it is understood that communications systems may employ multiple eNBs capable of communicating with a number of UEs, only one eNB, and a number of UEs are illustrated for simplicity.

NOMA is a technique that increases spectral efficiency by co-scheduling UEs with very different path losses in the power domain. Transmissions to UEs that are closer to the eNB are generally allocated lower transmit power levels than transmissions to UEs that are further away.

Figure 2:
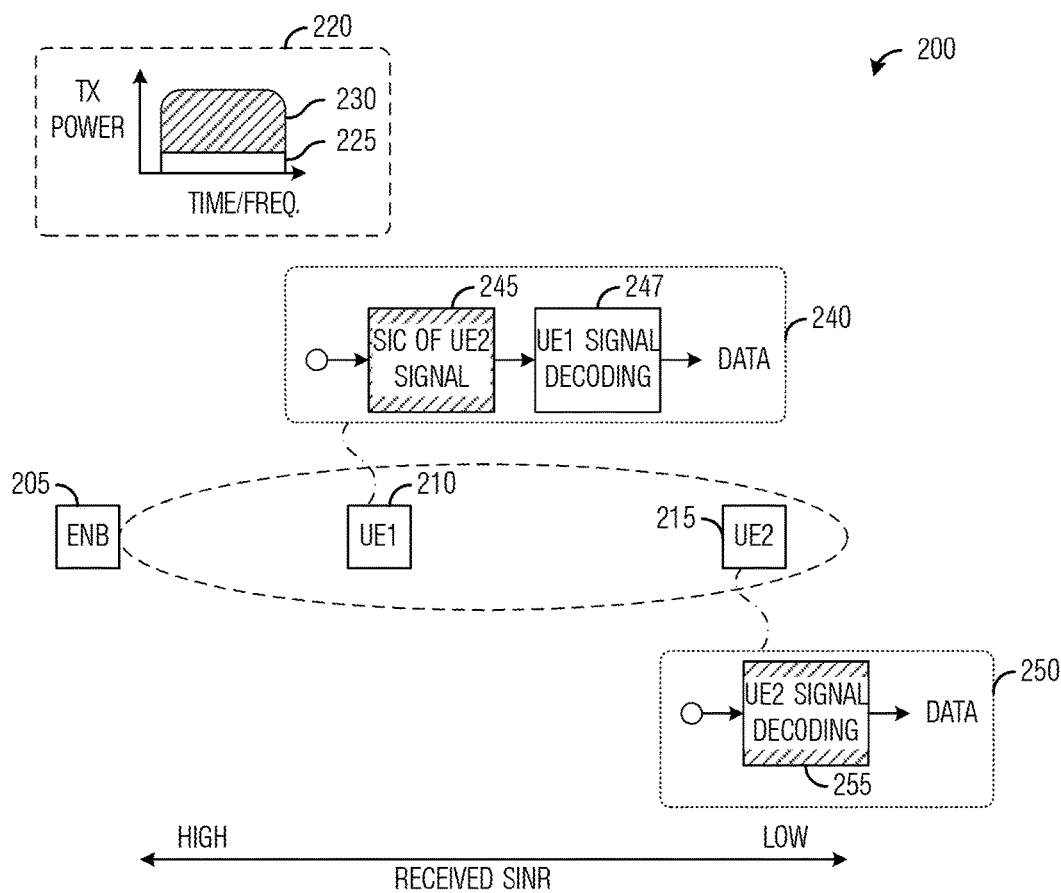
FIG. 2 illustrates an example communications system highlighting NOMA operation according to example embodiments described herein.

FIG. 2 illustrates an example communications system 200 highlighting NOMA operation. Communications system 200 includes an eNB 205 serving UE1 210 and UE2 215. As shown in FIG. 2, UE1 210 is closer to eNB 205 than is UE2 215. In general, the received signal plus interference to noise ratio (SINR) is higher when a UE is closer to an eNB (the source of a transmission) and lower when the UE is further away from the eNB. Although FIG. 2 illustrates a relationship between distance from transmission source and path loss, it may be possible that two UE that are relatively the same distance from the eNB to have dissimilar path losses. Therefore, separation should not be construed as the only contributor to path loss.

A sub-graph 220 illustrates transmit power vs time/frequency plot of transmissions by eNB 205 to UE1 210 and UE2 215. As shown in sub-graph 220, the transmissions to UE1 210 (block 225) are made at a fraction of the transmit power of the transmissions to UE2 215 (block 230). In general, the greater the path loss between an eNB to a UE, the greater the transmit power of the transmissions between the eNB and the UE.

UEs that are closer to (or with less path loss) the eNB (e.g., UE1 210) may effectively remove multi-user (MU) interference using an interference cancelling (IC) technique, such as serial interference cancellation (SIC), prior to decoding the wanted transmission (i.e., the portion of the received transmission that is intended for the closer (or less path loss) UEs) to obtain the wanted signal. Highlight 240 illustrates an example decoding operation at UE1 210 (UE1 210 may use SIC to remove interference (block 245) and then decode the received signal with interference removed (block 247) to produce data intended for UE1 210). The SIC technique works very effectively when there is a large power difference between the wanted signal and the MU interference. UEs that are further away (or with more path loss) from the eNB (e.g., UE2 215) may have low MU interference and can simply decode a received transmission. Highlight 250 illustrates an example decoding operation at UE2 215 (UE2 215 may decode the received signal to produce data intended for UE2 215).

NOMA usually requires only channel quality indicator (CQI) feedback for power control purposes (as opposed to full channel knowledge (as required for three-dimensional multi-user multiple input multiple output (3D MU-MIMO)), which makes it potentially robust and attractive for co-scheduling of UEs with different path losses (which may or may not a result of their different distance to the eNB).

Millimeter wave (mmWave) technology has been used in a variety of short range wireless local area network (WLAN) applications at 60 GHz, including Wireless HD, European Association for Standardizing Information and Communication Systems (ECMA) Standard ECMA-367, IEEE 802.15.3c, Wireless Gigabit Alliance (WiGig), IEEE 802.11ad, and the like. A majority of the mmWave technology standards use an iterative multi-level codebook approach, often referred to as beam training, where transmission beams generally start from a wide beam and then successively proceed to narrower beams to find a best transmission beam combination between access point (a device similar in function to an eNB) and station (a device similar in function to a UE).

Figure 3A:
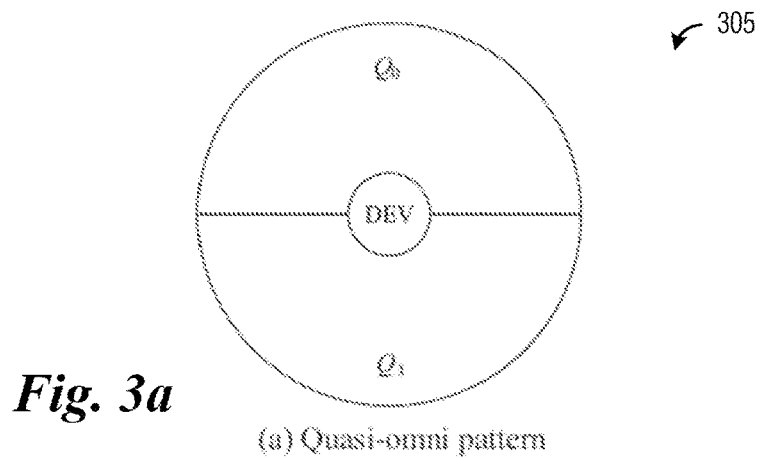
FIGS. 3a-3c illustrate different levels of transmission beams.
Figure 3B:
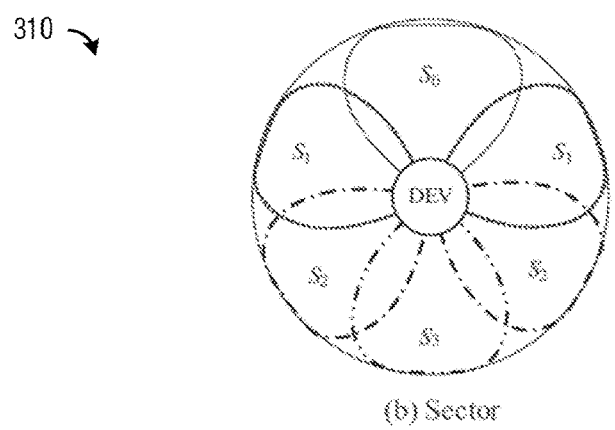
Figure 3C:
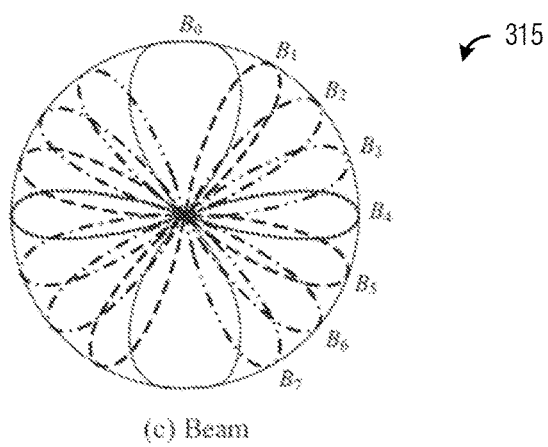

FIGS. 3a-3c illustrate different levels of transmission beams. FIG. 3a displays quasi omni-directional beams 305, while FIG. 3b displays beams 310 that are sector wide and FIG. 3c displays beams 315 that are sub-sector wide.

According to an example embodiment, multi-level codebooks may be used at eNBs and/or UEs in Fifth Generation (5G) mmWave cellular operations for data transmission. In a communications system configured for frequency division duplex (FDD) operation, feedback from UE to eNB may be codebook based feedback based on channel state information reference signal (CSI-RS) signaling. Due to the high path loss at mmWave frequencies, the CSI-RS will have to be beamformed with enough beamforming gain (and therefore will use correspondingly narrow beams) so that cell edge UEs can receive the CSI-RS with sufficiently high signal to noise ratio (SNR) and then subsequently feedback CSI information to the eNB. In a communications system configured for time division duplex (TDD) operation, the UE may send uplink sounding reference signals (SRS) for different eNB to UE transmission beam combinations. The transmission beams may be codebook based and the eNB may choose the best transmission beam combination and use an uplink measured channel (H) for that transmission beam combination to perform non-codebook based beamforming.

Since the SRS sounding for all possible eNB to UE transmission beam combinations may result in an extremely high overhead, TDD operation may also use CSI-RS feedback to reduce the number of possible eNB to UE transmission beam combinations for SRS sounding.

In either situation (TDD or FDD), the eNB may beamform the final data using either a codebook or a non-codebook based approach. The eNB may also use a demodulation reference signal (DMRS) based approach to data transmission.

When a UE has high mobility, the CSI-RS feedback will need to be of sufficient frequency so that the UE receives the best transmission beam from the eNB.

Figure 4:
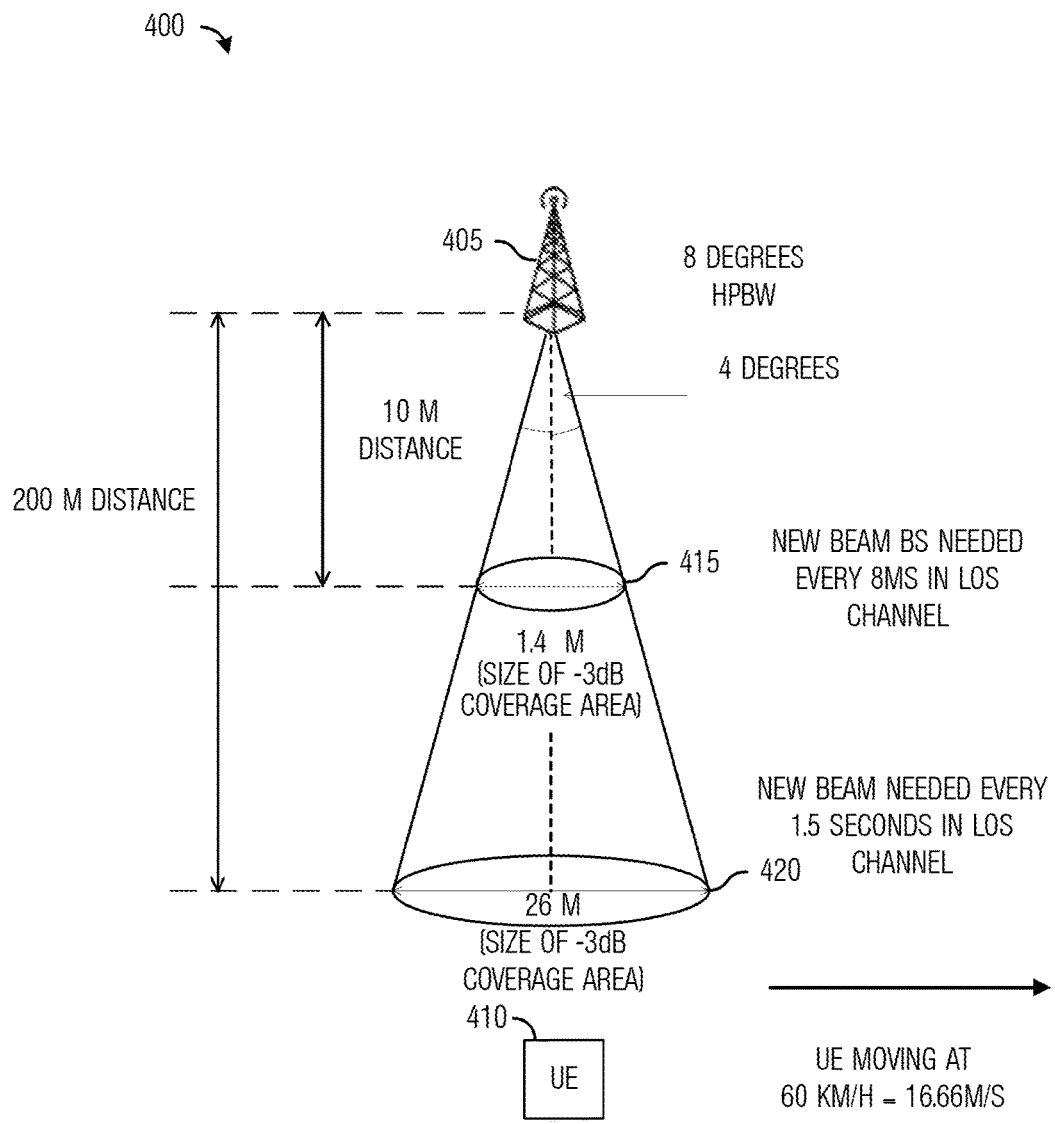
FIG. 4 illustrates an example communications system highlighting mobility and transmission beam width on a frequency of transmission beam changes according to example embodiments described herein.

FIG. 4 illustrates an example communications system 400 highlighting mobility and transmission beam width on a frequency of transmission beam changes. Communications system 400 includes an eNB 405 serving a UE 410. UE 410 is moving rapidly through the coverage area of eNB 405. For discussion purposes, consider a situation wherein eNB is transmitting data to UE 410 using a fixed beam with a half power beam width (HPBW) of 8 degrees and that UE 410 is moving at 60 kilometers/hour or 16.66 meters/second. With the 8 degree HPBW, the transmission beam spans an area of 1.4 meters (shown as region 415) at a distance of 10 meters from eNB 405 and an area of 26 meters (shown as region 420) at a distance of 200 meters from eNB 405. Therefore, if UE 410 is 10 meters from eNB 405, a new transmission beam is needed every 8 milliseconds, while if UE 410 is 200 meters from eNB 405, a new transmission beam is needed every 1.5 seconds (both times are derived for in a line of sight (LOS) scenario). Therefore, UEs that are closer to their eNBs may have to provide feedback to the eNBs at a much higher rate than the UEs that are further away from their eNBs and subsequently, the eNBs have to change the transmission beams assigned to those UEs at a much higher rate. The above example is for a simplified LOS scenario. Localized scatter (at the UE), non-LOS (NLOS) operation, moving "blocking" objects (such as vehicles and the like), that are close to the eNB, and so on, may reduce the rate difference. Additionally, with fixed width transmission beams, the UEs that are closer to the eNBs may have an extremely large SNR margin compared to the UEs that are further away.

Figure 5:
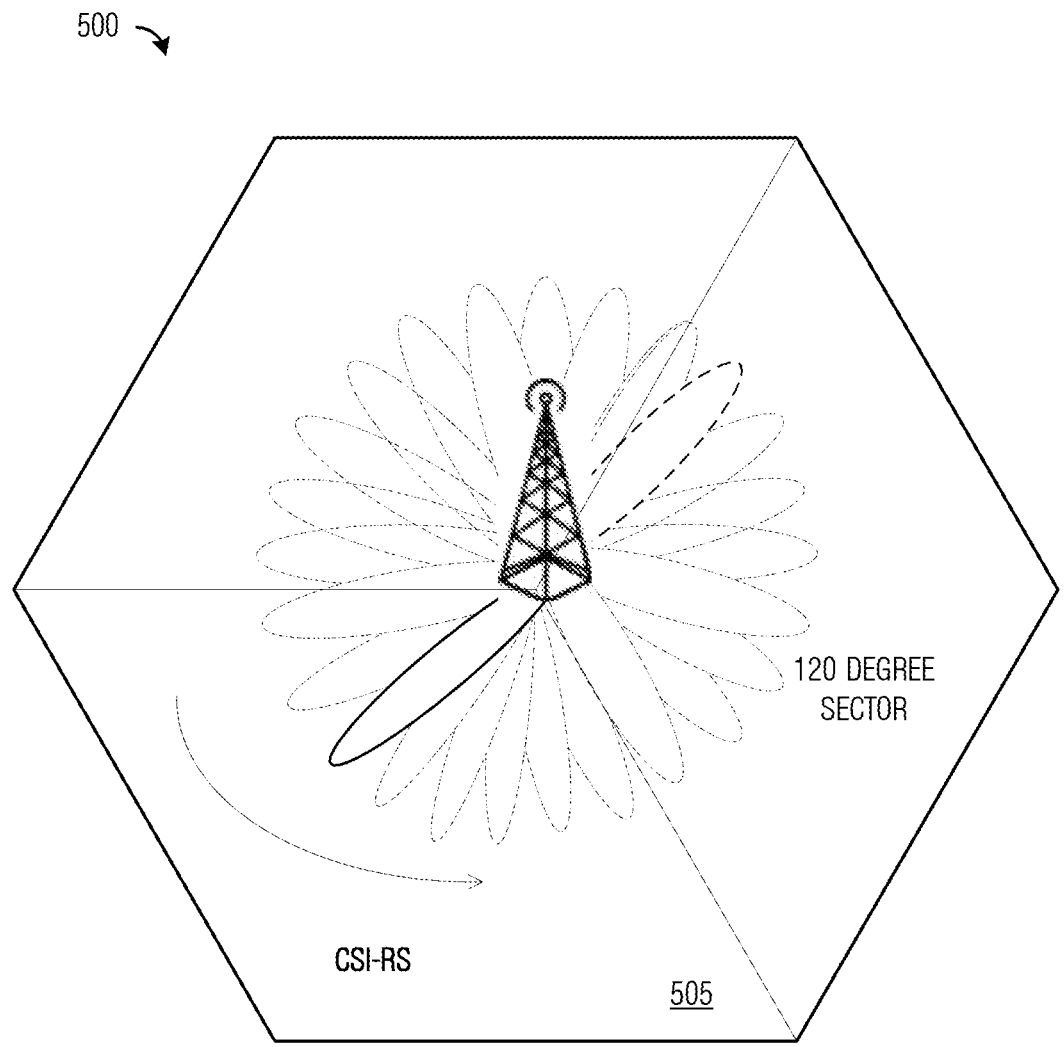
FIG. 5 illustrates an example eNB and its coverage area according to example embodiments described herein.

FIG. 5 illustrates an example eNB 500 and its coverage area. eNB 500 has a coverage area that is divided into three 120 degree sectors, such as sector 505. eNB 500 may transmit a CSI-RS on transmission beams with 8 degree half-power bandwidth (HPBW). For a single 120 degree sector, such as sector 505, the use of transmission beams with 8 degree HPBW implies that there are 15 transmission beams per sector. If a UE served by eNB 500 also has 4 beams of its own, each UE may have to evaluate up to 60 CSI-RS combinations it is to report feedback.

Figure 6:
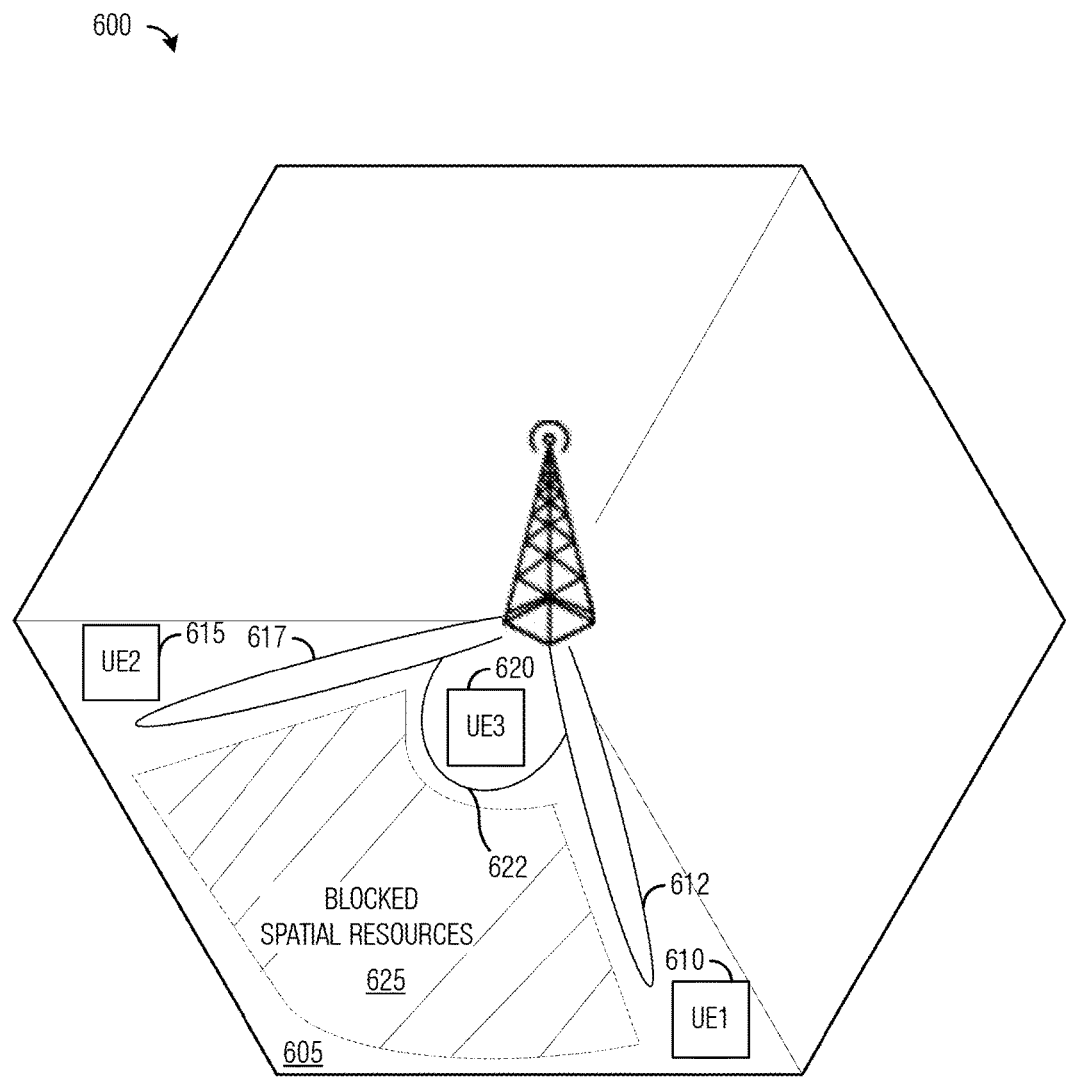
FIG. 6 illustrates an example eNB, highlighting blocked spatial resources according to example embodiments described herein.

FIG. 6 illustrates an example eNB 600, highlighting blocked spatial resources. eNB 600 has a coverage area that is divided into three 120 degree sectors, such as sector 605. eNB 600 may be serving three UEs in sector 605, UE1 610, UE2 615, and UE3 620. To alleviate the issue mentioned previously in the discussion of FIG. 4 and in order to increase link robustness for mobility, it may be reasonable for eNB 600 to assign a wider width transmission beam (either codebook or non-codebook based) to UEs that are closer to eNB 600 and/or those with high mobility than that assigned to UEs that are stationary and/or further away from eNB 600. As shown in FIG. 6, a wider width transmission beam 622 may be assigned to UE3 620, while narrower width transmission beams 612 and 617 may be assigned to UE 1 610 and UE2 615. Although allocating wider width transmission beams to closer UEs and/or high mobility UEs improves link robustness, spatial resources may be blocked (shown as region 625). The blocked spatial resources are generally not usable by other UEs and are therefore wasted. The blocked spatial resources may be alleviated through the use of 3D beamforming, but 3D beamforming may also be sensitive to feedback for UE with high mobility.

According to an example embodiment, narrow width transmission beams are co-scheduled on top of (i.e., spatially overlapping) wide width transmission beams to help eliminate blocked spatial resources. The narrow width transmission beams may be scheduled on top of (i.e., spatially overlapping) wide width transmission beams if UEs served by the wide width transmission beams have interference cancellation (IC) capabilities. In general, two beams may be said to be spatially overlapping (or on top of one another) if their spatial responses overlap and/or if they cause significant interference to each other. The UEs served by the narrow width transmission beams may not need to be IC capable if their received interference level is low. This technique is referred to herein as multi-level beamformed NOMA (MLB-NOMA).

Figure 7:
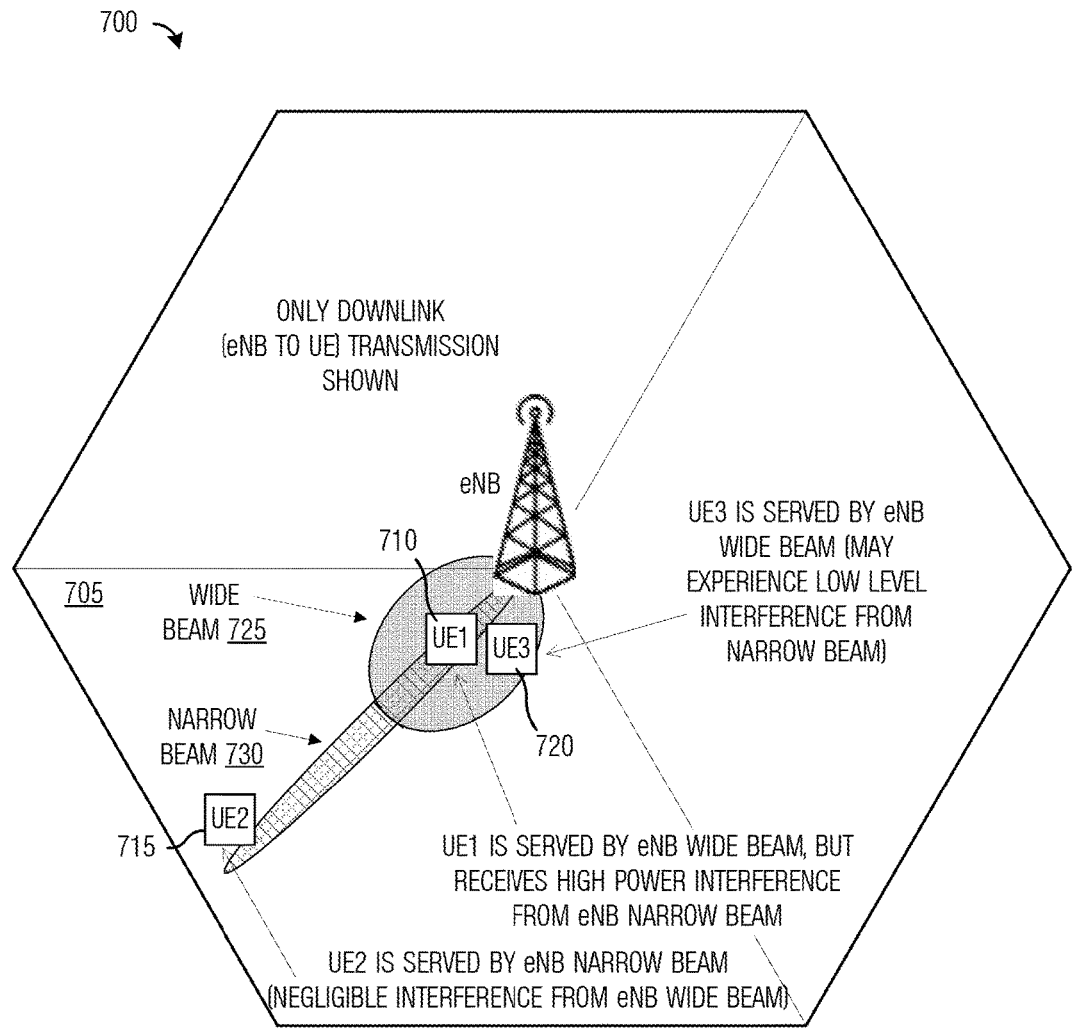
FIG. 7 illustrates an example eNB, highlighting the co-scheduling of narrow width transmission beams and wide width transmission beams according to example embodiments described herein.

FIG. 7 illustrates an example eNB 700, highlighting the co-scheduling of narrow width transmission beams and wide width transmission beams. eNB 700 has a coverage area that is divided into three 120 degree sectors, such as sector 705. eNB 700 may be serving three UE in sector 705, UE1 710, UE2 715, and UE3 720. UE1 710 and UE3 720 are close to eNB 700 and/or they are high mobility UEs, so they may be served by a wide width transmission beam 725. As shown in FIG. 7, UE3 720 may be served by wide width transmission beam 725. Due to its location relative to narrow width transmission beam 730, UE3 720 may experience low level interference from narrow width transmission beam 730. Similarly, UE2 715 may be served by narrow width transmission beam 730. Since UE2 715 is well outside of the coverage area of wide width transmission beam 725, UE2 715 may receive negligible interference from wide width transmission beam 725. UE1 710 may also be served by wide width transmission beam 725. However, UE1 710 may receive high power interference from narrow width transmission beam 730. It is noted that only downlink transmissions are shown. The example embodiments discussed herein may also be applicable to uplink transmissions.

Furthermore, different angular zones of the wide width transmission beams may have different levels of interference. According to an example embodiment, the different levels of interference are used to schedule different classes of UEs.

Figure 8:
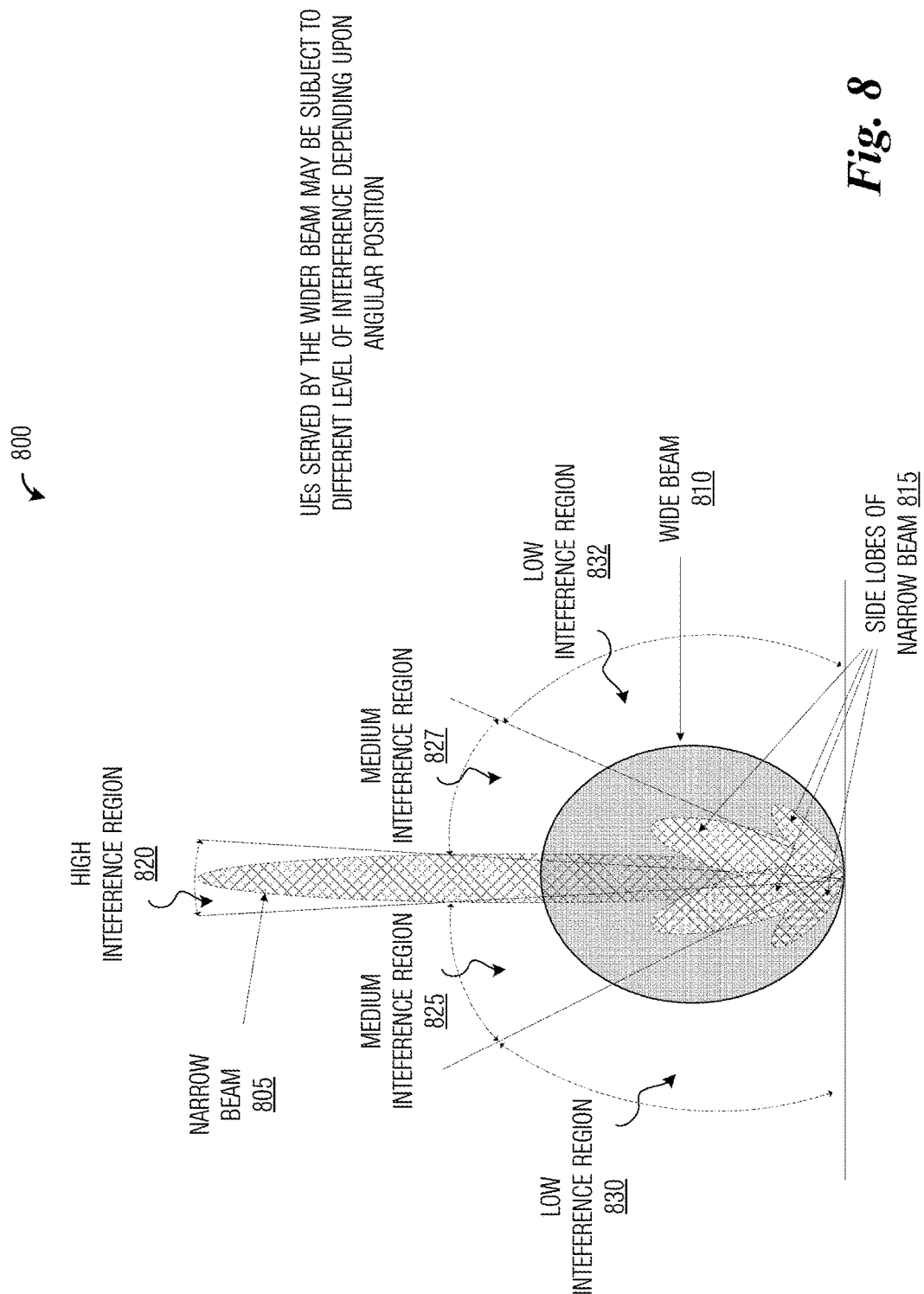
FIG. 8 illustrates example transmission beams according to example embodiments described herein.

FIG. 8 illustrates example transmission beams 800. As shown in FIG. 8, transmission beams 800 include a narrow width transmission beam 805 and a wide width transmission beam 810. Narrow width transmission beam 805 may include a plurality of side lobes 815. Different angular zones of the coverage area of wide width transmission beam 810 may have different levels of interference from narrow width transmission beam 805. A first region that is fully covered by narrow width transmission beam 805 receives a high level of interference from narrow width transmission beam 805 and is referred to as a high interference region 820. Two regions that are fully covered by the largest side lobes of narrow width transmission beam 805 receives a medium level of interference from narrow width transmission beam 805 and are referred to as medium interference regions 825 and 827. Two regions that are fully covered by the smaller side lobes of narrow width transmission beam 805 receives a small level of interference from narrow width transmission beam 805 and are referred to as low interference regions 830 and 832.

According to an example embodiment, MLB-NOMA is one mode of operation out of a plurality of possible operation modes. An operation mode will be selected to provide the best performance for a given scenario. Other modes of operation may include a single scheduled UE (e.g., single user multiple input multiple output (SU-MIMO), transmit and/or receive diversity, and so on) and multiple scheduled UEs using traditional techniques (e.g., multiple user MIMO (MU-MIMO), and the like).

According to an example embodiment, wide width transmission beam UEs with a wide range of capabilities are able to be co-scheduled with narrow width transmission beam UEs. Since the wide width transmission beams have different interference regions, UEs served by the wide width transmission beams do not necessarily have to be IC capable to be co-scheduled with UEs served by narrow width transmission beams. As an illustrative example, any UE (does not need to be IC capable) may be scheduled in a low interference region (such as low interference regions 830 and 832). While in a high interference region (such as high interference region 820), UEs have to be SIC capable to be scheduled, and in a medium interference region (such as medium interference region 825 and 827), UEs have to have advanced IC capabilities.

According to an example embodiment, UEs are categorized in accordance to their IC capabilities. As an illustrative example, 4 IC capability categories may be used: Category 1 (00) no IC capability; Category 2 (01) at least SIC capable; and Category 3 and 4 (10 and 11) advanced IC capabilities. With 4 IC capability categories, a 2-bit indicator may be used to indicate UE IC capability.

Figure 9:
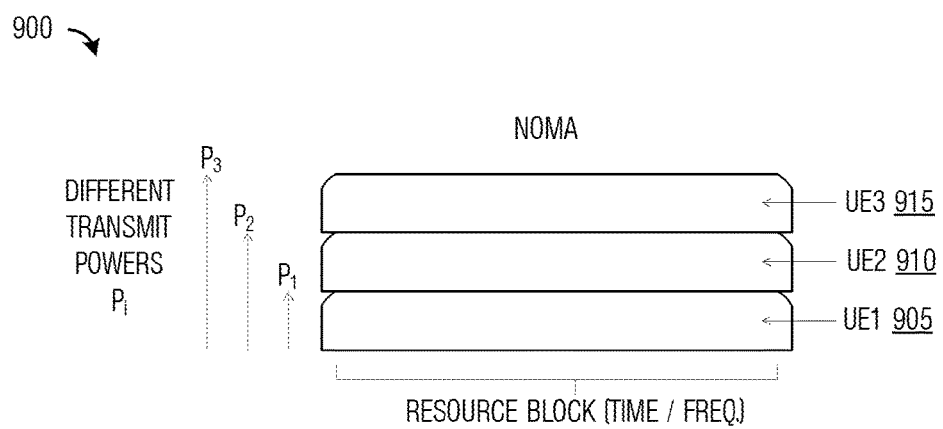
FIG. 9 illustrates a diagram of example transmit power level allocations for different UEs in NOMA.

FIG. 9 illustrates a diagram of example transmit power level allocations 900 for different UEs in NOMA. In NOMA, different UEs are allocated different transmit power levels. Transmit power control is performed at an eNB to co-schedule UEs with different path losses. To simplify the transmit power control and UE scheduling, the UEs may be grouped into different but defined transmit power levels. As shown in FIG. 9, UE1 905, UE2 910, and UE3 915 are assigned transmit power levels $P_1$, $P_2$, and $P_3$, respectively.

It is noted that effective transmit power is equal to the transmit power level plus transmit antenna gain (i.e., TXeffective_power=TXpower+TXgain). Therefore, it may be possible to achieve different transmit power levels by adjusting the transmit antenna gain instead of (or in addition to) changing the transmit power level (which may be the output power of a power amplifier(s) (PA) of a radio frequency (RF) chain of a transmitting device).

According to an example embodiment, different effective transmit power levels are achieved by adjusting the transmit antenna gain (e.g., by beamforming) instead of (or in addition to) changing the transmit power level.

Figure 10:
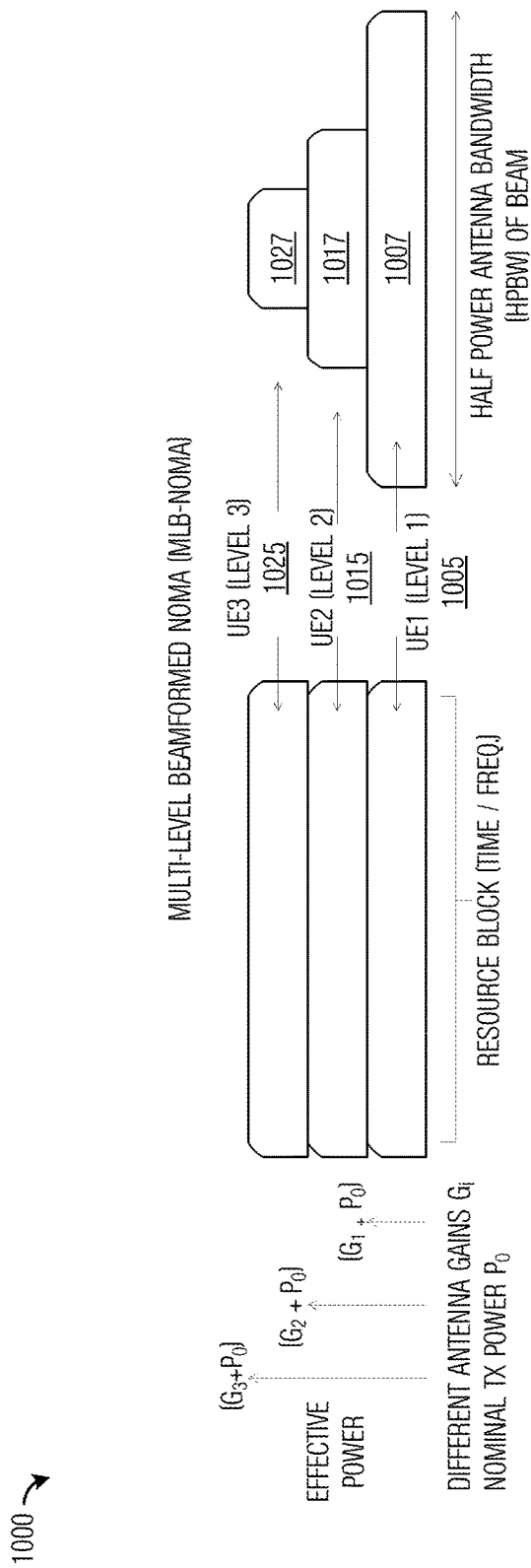
FIG. 10 illustrates a diagram of example transmit power level allocations for different UEs in MLB-NOMA according to example embodiments described herein.

FIG. 10 illustrates a diagram of example transmit power level allocations 1000 for different UEs in MLB-NOMA. In MLB-NOMA, different UEs are allocated different effective transmit power levels that are adjusted by changing the transmit antenna gain (and also possibly through adjustments in the transmit power level). Changing the transmit antenna gain also has an impact on the HPBW of the transmission beams. Generally, the wider the width of a transmission beam, the smaller the transmit antenna gain. Conversely, the narrower the width of a transmission beam, the larger the transmit antenna gain.

As shown in FIG. 10, UE1 (or UEs grouped into a first effective transmit power level (level 1)) 1005 is assigned wide width transmission beams 1007 with a low effective transmit power level, while UE3 (or UEs grouped into a third effective transmit power level (level 3)) 1025 is assigned narrow width transmission beams 1027 with a high effective transmit power level. UE2 (or UEs grouped into a second effective transmit power level (level 2)) 1015 is assigned medium width transmission beams 1017 with a medium effective transmit power level. The low, medium, and high effective transmission power levels are all achieved through different antenna gains $G_i$ while keeping a nominal transmit power level $P_0$ from the power amplifier (PA) constant. When beamforming gain is used instead of transmit power level control for NOMA, the required linear dynamic range of the PAs (e.g., mmWave PAs) of the respective RF chains may be reduced, leading to a decrease in the required PA back off. This may lead to higher PA efficiency. It is noted that it is also possible to adjust the PA transmit power level in addition to changing the antenna gain.

Figure 11:
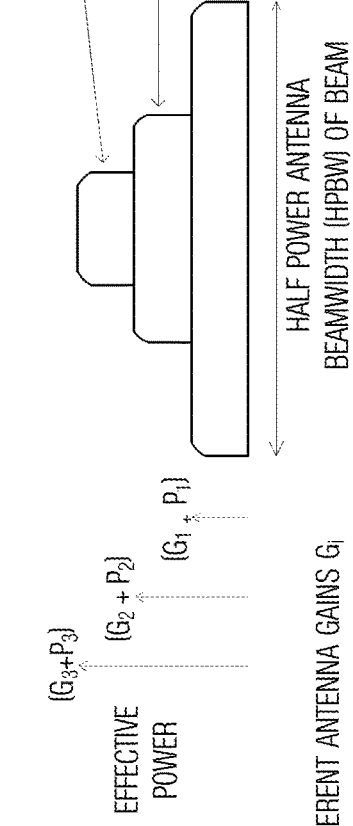
FIG. 11 illustrates a diagram of example transmission beam allocations for different UEs in MLB-NOMA according to example embodiments described herein.

FIG. 11 illustrates a diagram of example transmission beam allocations 1100 for different UEs in MLB-NOMA. In MLB-NOMA, different UEs are allocated different transmit power levels that are adjusted by changing the transmit antenna gain. As shown in FIG. 11, UEs that are grouped in level 1 1105 may be assigned transmission beams beamformed using 2 transmit antennas (or phase shifters) which have a spacing of ½λ (wavelength), resulting in a HPBW of approximately 50 degrees. Similarly, UEs that are grouped in level 2 1110 may be assigned transmission beams beamformed using 4 transmit antennas (or phase shifters) which have a spacing of ½λ, resulting in a HPBW of approximately 25 degrees, while UEs that are grouped in level 3 1115 may be assigned transmission beams beamformed using 8 transmit antennas (or phase shifters) (again with ½λ spacing), resulting in a HPBW of approximately 12.5 degrees. As shown in FIG. 11, the transmit power levels for the different groups may be achieved through different antenna gain as well as different nominal transmit power levels. The nominal transmit power levels (e.g., $P_1$, $P_2$, and $P_3$) for the different width transmission beams may be all the same (e.g., equal to $P_0$) or may be adjusted to compensate for differences in beam gain (which may be especially useful for non-codebook transmission beams) and/or to improve performance of SIC receivers.

The use of a multi-level codebook for transmission may allow UEs to be associated with different beam levels that are based on feedback from narrow beam (or beamformed) CSI-RS. The feedback may be in the form of channel quality indicators (CQI), reference signal received power (RSRP) feedback, and the like. The association of UEs to different beam levels may also be based on UE mobility. The UE mobility may be estimated by the eNB or reported to the eNB.

In the case when non-codebook transmission is used, the number of phase shifters (or antennas) assigned per transmission beam may determine a minimum beam width of the non-codebook formed beam. However, the actual non-codebook based beam width may be much greater than the minimum beam width.

According to an example embodiment, digital precoding is combined with RF (or analog) beamforming. Since an eNB has a finite number of phase shifters (or antennas) and RF chain resources, the use of multi-level beams uses these finite resources effectively since a subset of the narrow width transmission beams may be used at the same time for a wide width transmission beam.

Figure 12:
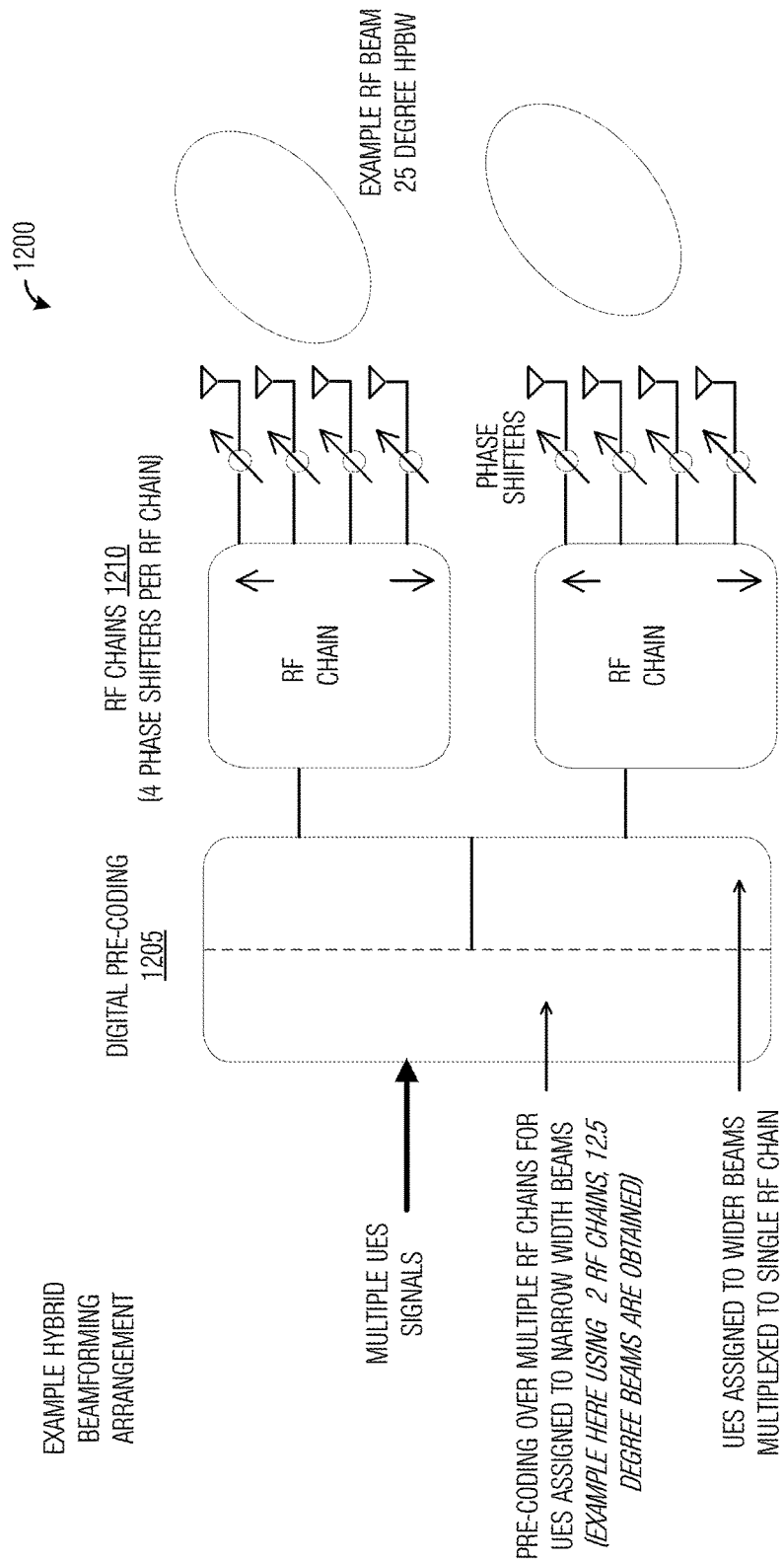
FIG. 12 illustrates an example hybrid beamforming circuitry according to example embodiments described herein.

FIG. 12 illustrates an example hybrid beamforming circuitry 1200. Hybrid beamforming circuitry 1200 includes a digital precoding section 1205 and one or more RF chains 1210, with each RF chain including 4 phase shifters. Digital precoding section 1205 may apply precoding over the one or more RF chains for UEs that are assigned to narrow width transmission beams. As an illustrative example, two RF chains are used to achieve 12.5 degree transmission beams. The same hybrid beamforming circuitry 1200 also allows for UEs that are assigned to wider width beams to be multiplexed to a single RF chain.

As discussed previously, the demodulation reference signal (DMRS) is a UE specific reference signal that is used by UEs to assist in demodulation of data transmissions. Since the position of a UE relative to an interfering transmission beam may vary, different transmission beam levels shall use different DMRS resources so that the power levels of the interfering beams and respective DMRS resources at the receiving UEs can be determined and IC at the receiving UEs can be configured. The location (time and frequency resources) of the DMRS resources of co-scheduled UEs needs to be known at each UE for IC purposes. The location of the DMRS resources may be signaled (explicitly or implicitly). As an illustrative example, a UE with IC capability may be signaled regarding the specific location of the DMRS resources of other co-scheduled UEs and the UE may measure the received power of the other co-scheduled UEs at the signaled locations DMRS resources and configure its IC receiver in accordance with the measurements.

Figure 13A:
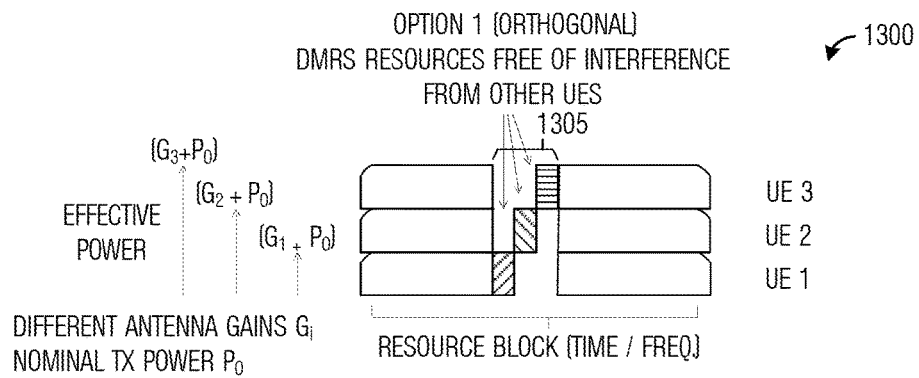
FIG. 13a illustrates a first example of demodulation reference signal (DMRS) resource location according to example embodiments described herein.

FIG. 13a illustrates a first example DMRS resource location 1300. First example DMRS resource location 1300 comprises a separate DMRS region 1305. Within DMRS region 1305, a DMRS for a particular transmission beam level is signaled while the DMRS for other transmission beam levels are not signaled. Separately signaling the DMRS for each transmission beam level provides the best estimate of a channel for a UE and the interference channel of the co-scheduled UEs. Different DMRS sequences may be used for different transmission beam level.

Figure 13B:
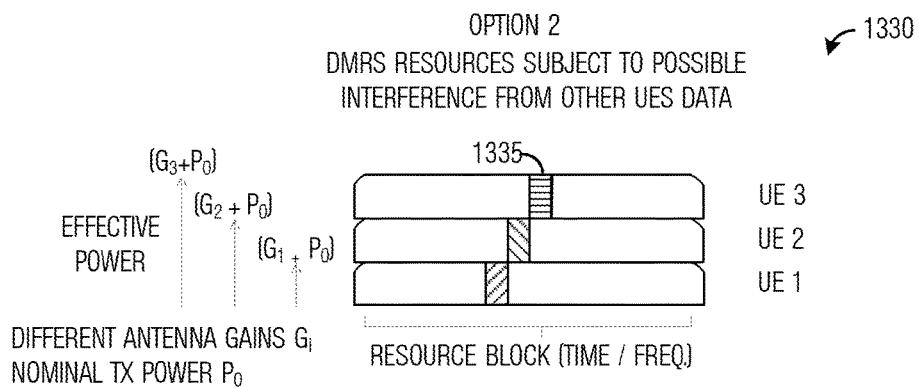
FIG. 13b illustrates a second example DMRS resource location according to example embodiments described herein.

FIG. 13b illustrates a second example DMRS resource location 1330. In second example DMRS resource location 1330, the DMRS for each transmission beam level is separately signaled as in first example DMRS resource location 1300. However, when a transmission beam level is not signaling its DMRS, it is signaling UE data. As an illustrative example, DMRS 1335 for UE 3 is signaled while UE data for UE 2 and UE 1 are signaled. Different DMRS sequences may be used for different transmission beam level.

Figure 13C:
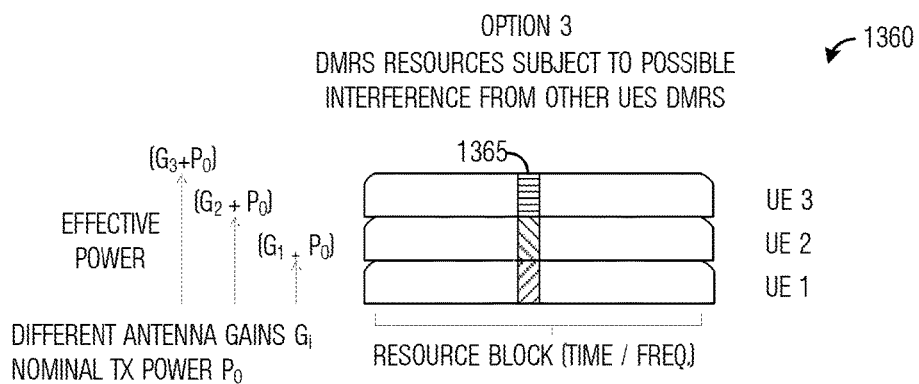
FIG. 13c illustrates a third example DMRS resource location according to example embodiments described herein.

FIG. 13c illustrates a third example DMRS resource location 1360. In third example DMRS resource location 1360, the DMRS for all transmission beam levels are signaled at the same time. As an illustrative example, DMRS 1335 for UE 3 is signaled while DMRS for UE 2 and UE 1 are also signaled. In this case the different transmission beam levels have to use different spreading (or scrambling) sequences for their DMRS resources.

Figure 14:
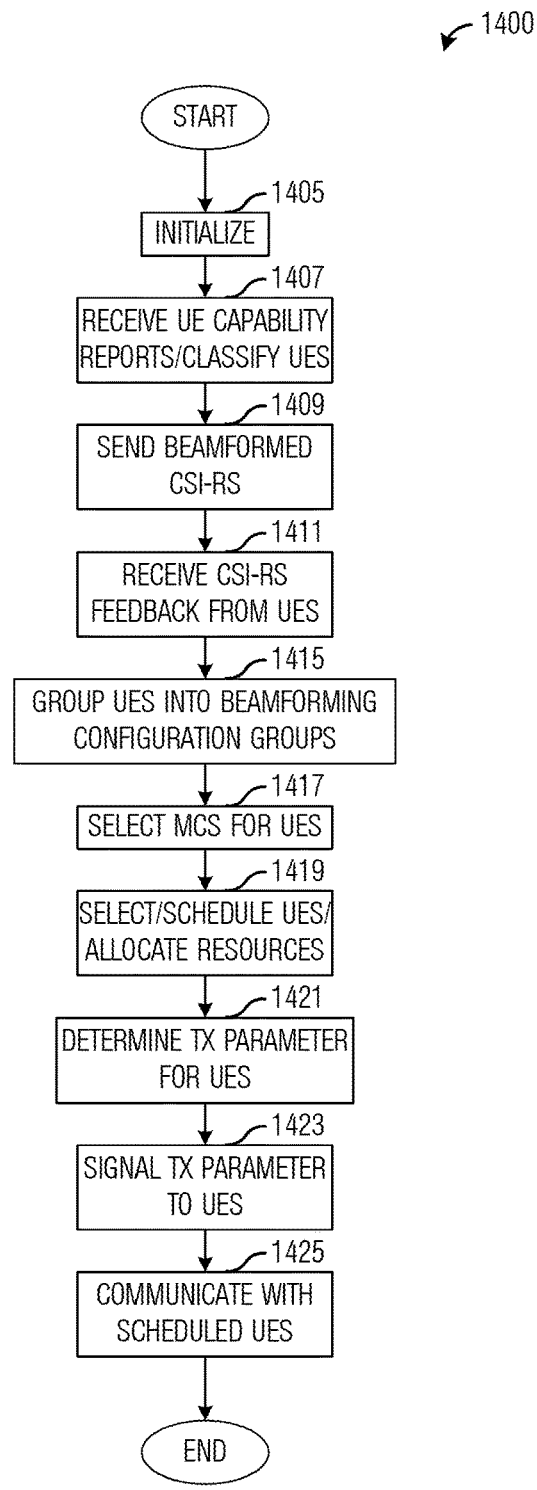
FIG. 14 illustrates a flow diagram of example high-level operations occurring in an eNB participating in MLB-NOMA communications according to example embodiments described herein.

FIG. 14 illustrates a flow diagram of example high-level operations 1400 occurring in an eNB participating in MLB-NOMA communications. Operations 1400 may be indicative of operations occurring in an eNB as the eNB participates in MLB-NOMA communications.

Operations 1400 may begin with the eNB initializing (block 1405). Initializing may include the eNB participating in a random access channel (RACH) procedure with one or more UEs. In other words, the eNB is obtaining knowledge of communications needs of the UEs that it is serving. The eNB may receive UE capability reports and classify the UEs (block 1407). The eNB may receive capability reports from its UEs. The capability reports may include information regarding the IC capability of the UEs, as well as the UEs' beamforming capability. The capability reports may also include MIMO capability, processing capability, and so on. The capability reports may be used to classify the IC capability of the UEs. As an illustrative example, the UEs may be classified into one of several classifications based on their IC capabilities. The classifications may include: no IC, simple IC, advanced IC, highly advanced IC.

The eNB may transmit beamformed CSI-RS (block 1409). The eNB may transmit the beamformed CSI-RS to at least some of its UEs. As an illustrative example, the eNB individually transmits different beamformed CSI-RS to permit the UEs to measure the channel for different receive beams. The eNB may cycle through its available transmission beams and transmit the beamformed CSI-RS for a specified number of communications system resources. The eNB may transmit the beamformed CSI-RS periodically, as specified by a technical standard, an operator of the communications system, or as conditions warrant the need to transmit the beamformed CSI-RS. The eNB may receive CSI-RS feedback from UEs (block 1411). The CSI-RS feedback received from the UEs may indicate which beamformed CSI-RS resulted in the best channel quality for the UE, for example.

The eNB may group UEs into beamforming configuration groups (block 1415). The beamforming configuration groups may specify a transmission beam selected for a UE. The beamforming configuration groupings may be determined in accordance with the CSI-RS feedback received from the UE. The beamforming configuration groupings may also be determined in accordance with the capabilities of the UE, as received in the UE capability report. As an illustrative example, each UE may be grouped into one of a plurality of beamforming configuration groups based on the CSI-RS feedback received from the UE, and the UE capability report of the UE. The grouping of the UEs may also be based on a mobility estimation for the UE. Examples of beamforming configuration groups may include: 1) UE that is in close proximity to the eNB; 2) UE that is highly mobile; 3) UE that is close to an edge of a coverage area of the eNB; 4) UE that is IC capable; 5) UE that is IC incapable; or a combination thereof. The grouping of the UEs may produce information about the groupings, as well as group memberships for each of the UEs. As an illustrative example, each UE may be grouped into one of the plurality of beamforming configuration groups and a list of UEs (an example of group membership information) belonging to each beamforming configuration group may be produced.

The eNB may select a modulation and coding scheme (MCS) for the UEs (block 1417). The MCS selection for a UE may be in accordance with a variety of selection criteria, which may include beamforming configuration group, UE capability, channel condition (as reported in the CSI-RS feedback), the final assigned beam-width for that UE for data, UE requirements, Quality of Service (QoS) requirements, communications system condition, communications system traffic, and so forth.

The eNB may select and schedule UEs and allocate communications system resources (block 1419). The eNB may schedule UEs based on scheduling criteria, which may include presence or absence of data to transmit to or receive from a UE, UE priority, data priority, UE service history, QoS requirements, UE location, UE mobility, UE beamforming configuration group, and the like. The eNB may utilize MLB-NOMA to schedule and co-schedule UEs. As an illustrative example, the eNB may schedule a wide width transmission beam to a UE that is close to the eNB or to one that is highly mobile. The eNB may also at the same time schedule a narrow width transmission beam to a UE that is far from the eNB. The UE that is scheduled to the wide width transmission beam may or may not require IC capability depending on its proximity to the narrow width transmission beam. The wide width transmission beam and the narrow width transmission beam may spatially overlap. The eNB may allocate communications system resources for the UEs that have been scheduled. The allocation of the communications system resources may be dependent on factors, such as available resources, resources needed and/or requested, demand for resources, and so on.

The eNB may determine transmission parameters for the UEs (block 1421). A transmission parameter may include information that is used by a UE to successfully complete communications with the eNB. As an illustrative example, for a normal UE (which does not have to perform IC although the UE may be IC capable), the transmission parameter may include MCS information, rank (a number of data layers in the communications), DMRS resource information, precoding matrix indicator (PMI), and so on. As another illustrative example, for a UE using IC, the transmission parameter may further include MCS information, rank, DMRS resource information, PMI, DMRS resource information for the co-scheduled UE(s).

The eNB may signal the transmission parameters to the UEs (block 1423). The transmission parameters may be individually signaled to each UE (via for example the PDCCH). Alternatively, the transmission parameters may be broadcasted to all UEs. The eNB may then subsequently communicate with the scheduled UEs (block 1425).

Figure 15:
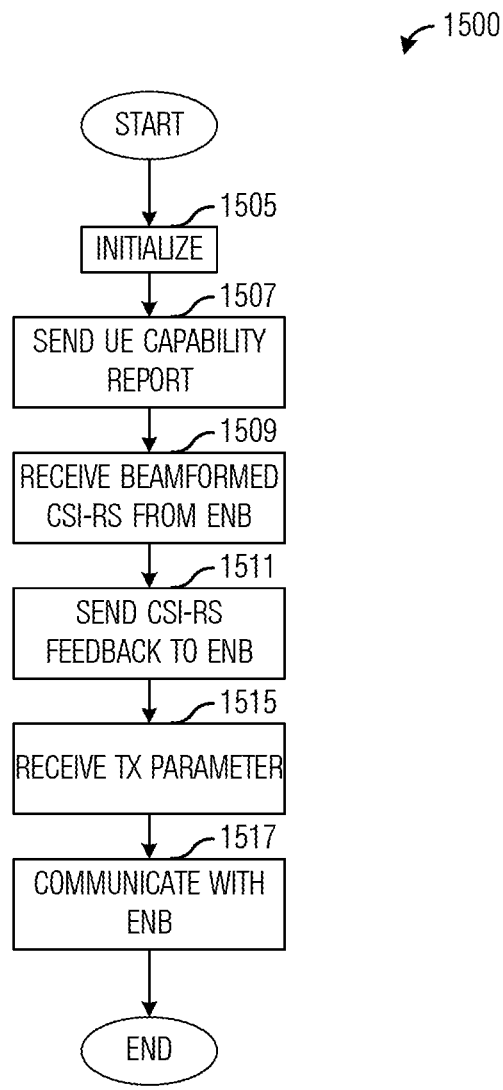
FIG. 15 illustrates a flow diagram of example high-level operations occurring in a UE participating in MLB-NOMA communications according to example embodiments described herein.

FIG. 15 illustrates a flow diagram of example high-level operations 1500 occurring in a UE participating in MLB-NOMA communications. Operations 1500 may be indicative of operations occurring at a UE participating in MLB-NOMA communications.

Operations 1500 may begin with the UE initializing (block 1505). Initializing may include the UE participating in a RACH procedure with its serving eNB. In other words, the UE may be providing its communications needs to the eNB. The UE may send a UE capability report to the eNB (block 1507). The UE may inform the eNB about its IC capability. The UE may also inform the eNB about its beamforming capability. The UE capability report may also include MIMO capability, processing capability, and the like.

The UE may receive beamformed CSI-RS (block 1509). The UE may cycle through its own available receiving beams for each of the received beamformed CSI-RS. For each of its receiving beams, the UE may measure the channel based on the beamformed CSI-RS. The UE may send CSI-RS feedback to the eNB (block 1511). As an illustrative example, the UE may send CSI-RS feedback for a specified number of receiving beams—beamformed CSI-RS combinations with the best measured channel. For example, the UE may report back N best receiving beam—beamformed CSI-RS combinations, where N is an integer number. Example values of N may be 1, 2, 3, 4, 5, 6, 7, 8, 9, 10, and the like. A limit on the value of N may include the receiver capability of the UE to receive the beamformed CSI-RS or limitations on the feedback channel. Alternatively, the UE may send CSI-RS feedback for each receiving beam—beamformed CSI-RS combination.

The UE may receive a transmission parameter from the eNB (block 1515). A transmission parameter may include information that is used by a UE to successfully receive data from the eNB. As an illustrative example, for a normal UE (which does not have to perform IC although the UE may be IC capable), the transmission parameter may include MCS information, rank (the number of data layers in the communications), DMRS resource information, precoding matrix indicator (PMI), and so on for the data assigned to that UE. As another illustrative example, for a UE using IC, the transmission parameter may include MCS information, rank, DMRS resource information, PMI for the data assigned to that UE and additionally, DMRS resource information for the co-scheduled UE(s), MCS information for co-scheduled UE(s), and so forth. As an illustrative example, the UE may use the DMRS resource information for the co-scheduled UE(s) to make received power measurements and use the received power measurements to configure its IC receiver. The UE may communicate with the eNB according to the transmission parameter (block 1517).

According to an example embodiment, the UE may provide an estimate of its mobility (or an estimate of channel variation as a function of time) to the eNB. A detailed discussion of mobility estimation is provided below. According to another example embodiment, the UE may feedback the CQI (or RSRP) for multiple neighboring CSI-RS beams, which may assist the eNB in determining a mobility estimate of the UE. A detailed discussion of the use of feedback regarding neighboring CSI-RS beams to estimate the mobility of a UE is provided below. According to yet another example embodiment, the UE may be provided with the transmission parameters of other co-scheduled UEs. The UE may provide the eNB with interference measurements of the co-scheduled UEs.

Figure 16A:
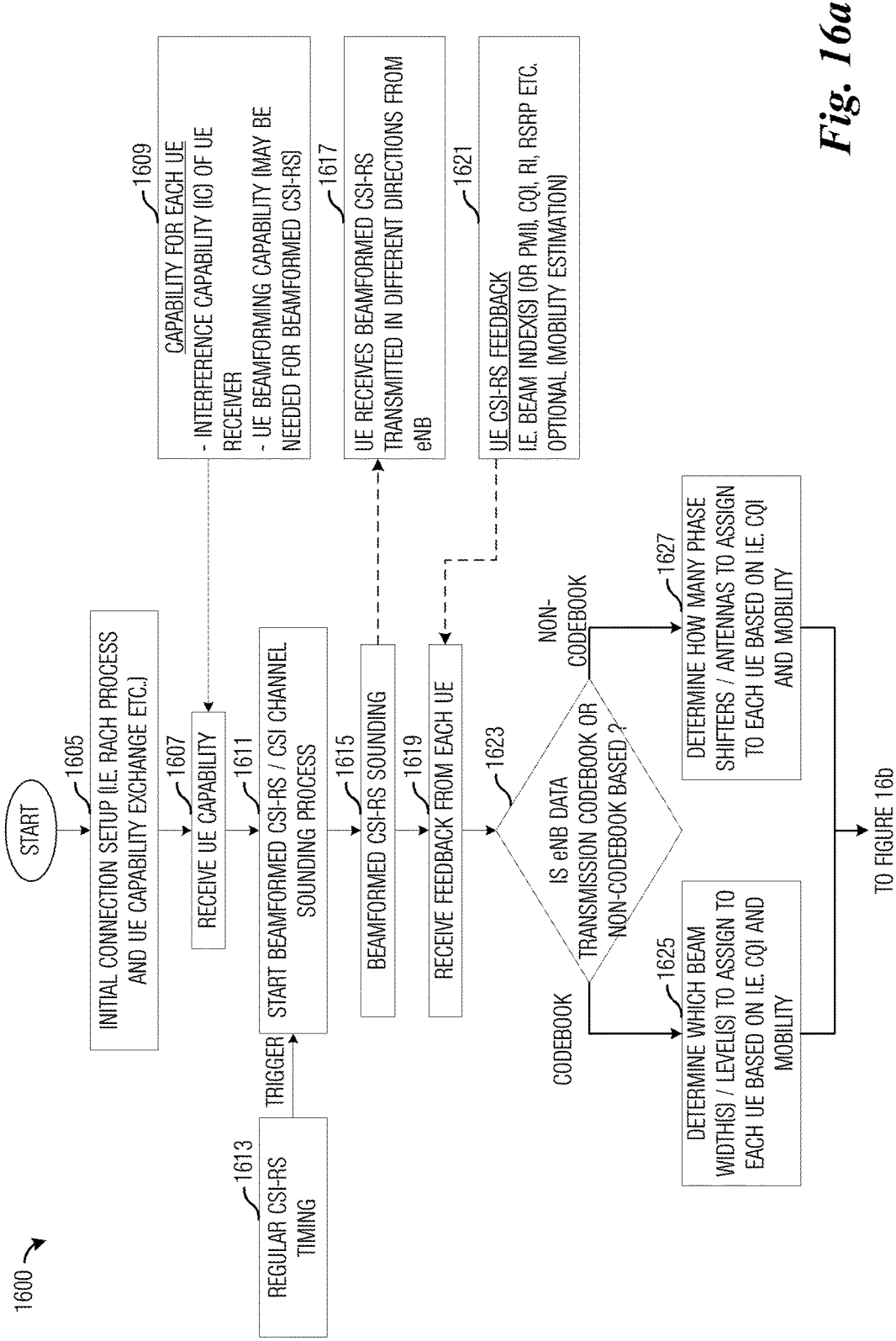
FIGS. 16a and 16b illustrate a flow diagram of example operations occurring during MLB-NOMA communications according to example embodiments described herein.
Figure 16B:
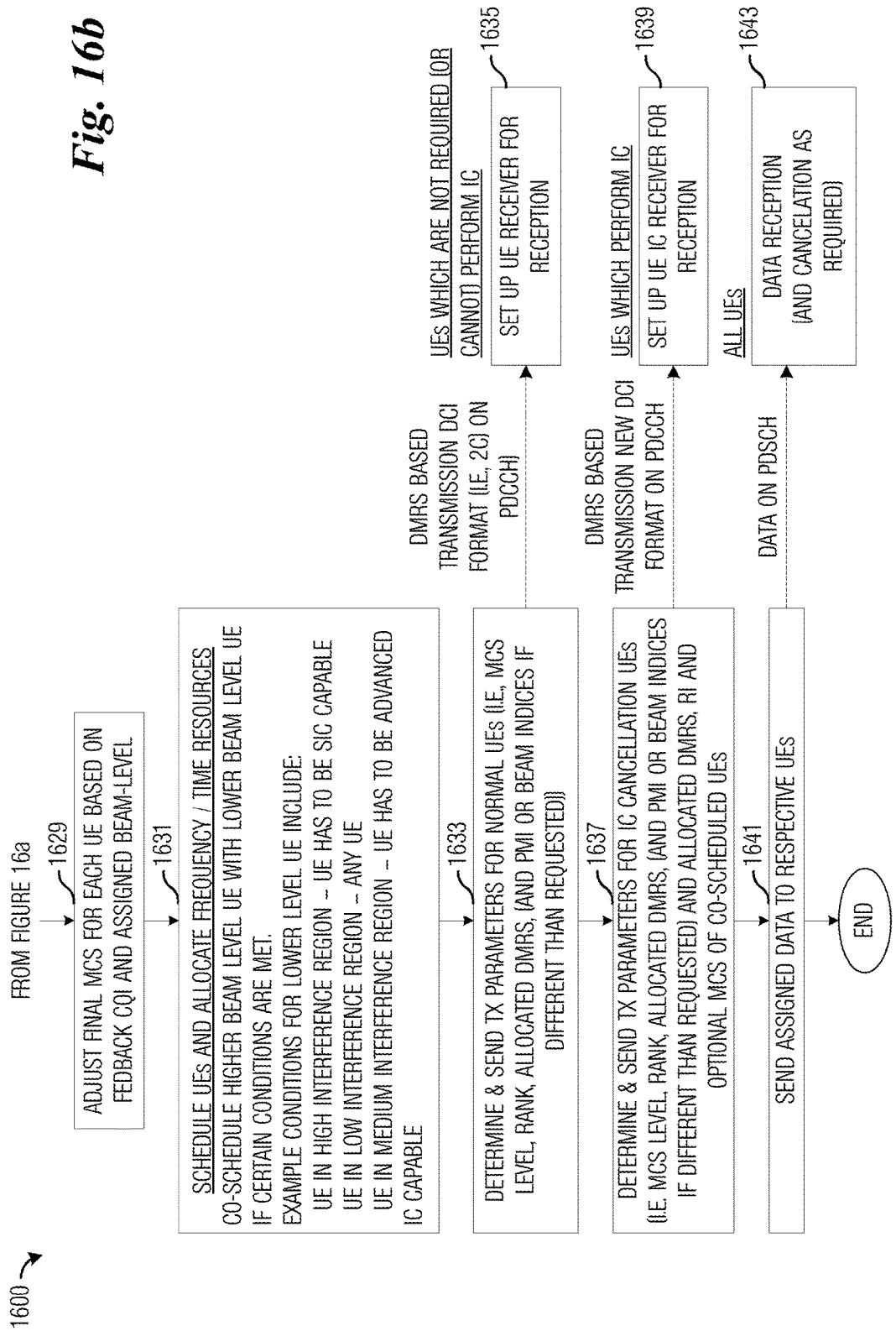

FIGS. 16a and 16b illustrate a flow diagram of example operations 1600 occurring during MLB-NOMA communications. Operations 1600 may be indicative of operations occurring in an eNB and UEs participating in MLB-NOMA communications.

Operations 1600 may begin with the eNB performing an initial connection setup with the UEs (block 1605). The initial connection setup may include establishment of a connection between the eNB and the UEs (by way of RACH processes, for example), UE capability exchanges, and so on. The eNB may receive UE capability reports from the UEs (block 1607). The UEs connected to the eNB may each send a UE capability report to the eNB. The UE capability report may include the IC capability of the UE, as well as the UE's beamforming capability (which may be needed for the beamformed CSI-RS used in channel sounding), and so on (block 1609). As an illustrative example, the IC capability of a UE may be classified into one of four classes and may be represented by a 2-bit indicator, which may help to reduce signaling overhead in transmitting the UE capability reports. An example of the four classes and its associated indicator value may be: 00=no IC capability; 01=simple IC (e.g., SIC only); 10=advanced IC; and 11=highly advanced IC. Each UE connected to the eNB may send its UE capability report to the eNB.

The eNB may start a CSI channel sounding process (block 1611). The channel sounding may involve transmitting beamformed CSI-RS. The eNB may utilize regular CSI-RS timing information (block 1613). As an illustrative example, the eNB may transmit the beamformed CSI-RS using narrow width transmission beams in different directions (block 1615). The eNB may transmit the beamformed CSI-RS to all UEs. The transmission of the beamformed CSI-RS may occur in multiple steps (e.g., from wide beam to narrow beam) or in a single step. The UEs served by the eNB may receive the beamformed CSI-RS transmitted by the eNB in different directions (block 1617). In addition to the directionality of the beamformed CSI-RS, the UEs may also have different receive beams that it can use when receiving the beamformed CSI-RS. When the UEs have different receive beams, there may be a plurality of different beamformed CSI-RS—receive beam combinations.

The eNB may receive CSI-RS feedback from the UEs (block 1619). The CSI-RS feedback may include transmission beam index (indices) of the CSI-RS directions which yield the highest spectral efficiency or the precoding matrix index (indices) (PMI), channel quality indicator (CQI), rank indicator (RI), reference signal received power (RSRP), and the like (block 1621). The CSI-RS feedback may be received at the eNB from each UE. The CSI-RS feedback may also include a mobility estimation for the UE. The mobility estimation may not necessarily mean that the UE is moving, but it refers to a rate in which the channel between the eNB and the UE is changing or a rate at which an optimum beam assigned by the eNB for that UE may change. This may be due to movement of the UE, as well as other blocking and/or reflecting objects present between the eNB and the UE. A detailed description of example mobility estimation techniques is provided below.

The eNB may perform a check to determine if it is to use codebook or non-codebook based transmission for each UE (block 1623). Codebook based transmission may limit the number of transmission beams to a known finite set of beams, while non-codebook based transmission may use an arbitrary beam shape. It is noted that although the discussion presented herein focuses on transmissions made by the eNB (i.e., downlink communications), the example embodiments presented herein are applicable to transmissions made by the UEs as well (i.e., uplink communications). Therefore, the focus on downlink transmissions should not be construed as being limiting to either the scope or the spirit of the example embodiments.

If codebook-based transmission is to be used, the eNB may determine which transmission beam width(s) and/or level(s) to assign to each UE (block 1625). The assignment of transmission beam width(s) and/or level(s) may be in accordance with the CSI-RS feedback received from the UEs, including CQI and UE mobility estimation. If non-codebook-based transmission is to be used, the eNB may determine how many phase shifters and/or antennas to assign to each UE (block 1627). The phase shifters and/or antennas may be associated with different transmission beam(s). The assignment of phase shifters and/or antennas may be in accordance with the CSI-RS feedback received from the UEs, including CQI and UE mobility estimation. In other words, the eNB is grouping the UEs into one of a plurality of transmission parameters. Blocks 1625 and 1627 may be implementations of grouping UEs into beamforming configuration groups. Operations 1600 continue in FIG. 16b.

The eNB may adjust a MCS for each UE (block 1629). The adjustment of the MCS for each UE may be in accordance with the CSI-RS feedback, as well as the assigned transmission beam(s). Since the CSI-RS feedback is based on beamformed CSI-RS, the eNB may need to adjust the MCS depending on the assigned transmission beam(s).

The eNB may schedule UEs (block 1631). The eNB may also allocate communications system resources. The eNB may schedule UEs based on scheduling criteria, including but not limited to presence of data for the UEs, buffer status of the UEs, priority of the UEs, service history of the UEs, QoS requirements of the UEs, communications system condition and/or traffic load, position of the UEs, mobility of the UEs, number of UEs, and the like. The eNB may co-schedule a higher level UE (a faraway UE) with a lower level UE (a close UE or high mobility UE) if co-scheduling conditions are met. Examples of conditions to co-schedule lower level UEs with higher level UEs may include: a) a lower level UE operating is in a high interference region of the higher level UE and the lower level UE is SIC capable; b) any lower level UE is in a low interference region of the higher level UE; and c) a lower level UE is in a medium interference region of the higher level UE and the lower level UE is advanced IC capable.

The eNB may determine and send transmission parameters for normal UEs which do not perform interference cancellation (block 1633). The eNB may select and transmit parameters for MCS level, rank (RI), allocated DMRS, (as well as PMI and/or beam index (indices)) if different than requested), and the like. The transmission of the DMRS allocation parameters may occur as specified in a DCI format, such as format 2C on a physical downlink control channel (PDCCH), for example. From 3GPP LTE-A, transmission parameters for downlink DMRS based transmissions may use DCI format 2C transmitted on the PDCCH (see section 5.3.3.1.5C of 3GPP Technical Standards TS 136.212 V11.5.0, which is hereby incorporated herein by reference). Using DCI format 2C, many UE specific items may be transmitted from the eNB to the UE, for example: i) MCS (5 bits) for each transport block (TB); and ii) DMRS antenna port (indicating orthogonal code, scrambling code, and number of layers (3 bits). The normal UEs may be UEs that are not IC capable or in a situation that does not require IC. The normal UEs may set up their receivers for reception (block 1635).

The eNB may determine and send transmission parameters for IC cancellation UEs (block 1637). The eNB may select MCS level, RI, allocated DMRS, (as well as PMI and/or beam index (indices)) if different than requested), and the like. The eNB may also send DMRS, RI, and MCS of co-scheduled UEs. The transmission of the DMRS may occur based on a new DCI format on the PDCCH. The exact information to transmit in a new DCI format used may be based on IC capability or IC class of the IC cancellation UEs. As an illustrative example, a modification of the existing DIC format 2C in order to support UEs with IC capability is as follows:

If UE capability=01 (SIC only), an additionally signaled item is DMRS antenna port(s) of the co-scheduled UE(s) (3 bits per co-scheduled UE);

If UE capability=10 (advanced), additionally signal items include DMRS antenna port(s) of the co-scheduled UE(s) (3 bits per co-scheduled UE) and modulation level of the co-scheduled UE(s) (2 bits be TB, with 4 bits maximum per UE); and If UE capability=11 (highly advanced), additionally signal items include DMRS antenna port(s) of the co-scheduled UE(s) (3 bits per co-scheduled UE) and MCS level of co-scheduled UE(s) (5 bits be TB, with 10 bits maximum per UE).

The IC cancellation UEs may set up their IC receivers for reception (block 1639).

The eNB may send data to the scheduled UEs (block 1641). The sending of the data may be in accordance with the allocated communications system resources, as well as the transmission parameters. The data may be sent on a physical downlink shared channel (PDSCH). The scheduled UEs may perform data reception (as well as IC for those so scheduled) (block 1643). The sending of data and the receiving of data may be examples of the eNB and the UE communicating with each other.

Since the example embodiments utilize DMRS-based transmission and that each co-scheduled UE will use a different DMRS resource within the same RB, the signaling of any additional transmission power or beam-forming parameter information (i.e. explicit transmission power) to set up the IC receiver for the co-scheduled UEs is not needed. The IC receiver can be configured based on the received power of the received DMRS from the co-scheduled users.

If the communications system is not a 3GPP LTE compliant communications system and that some other air interface is used, additional signaling for IC capable UEs (in general terms) may be summarized as follows:

If UE capability=01 (SIC only), an additionally signaled item is DMRS (or pre-coded channel estimation pilots) resources of co-scheduled UE(s);

If UE capability=10 (advanced), additionally signal items include DMRS (or pre-coded channel estimation pilots) resources of co-scheduled UE(s) and modulation level of co-scheduled UE(s); and If UE capability=11 (highly advanced), additionally signal items include DMRS (or pre-coded channel estimation pilots) resources of co-scheduled UE(s) and MCS level of co-scheduled UE(s).

Mobility estimation may be performed using a variety of techniques. According to an example embodiment, a UE is configured (using CSI-RS configuration, for example) to feedback an estimate of channel mobility, which is an estimation of the downlink channel variance over time. Since the UE may use channel variation from a received downlink channel estimation (using the DMRS, for example) from a presently assigned transmission beam for data, the eNB may adjust the transmission beam (for example, the beamwidth of the transmission beam) in accordance with the reported channel variation estimate.

According to another example embodiment, the UE is configured to feedback CQI (or RSRP) for the best CSI-RS beams. The eNB may compare the result between different reported instances of the feedback CQI (or RSRP) to estimate the mobility. Since the feedback (feedback CQI or RSRP) is already reported, the example embodiment incurs low overhead. Furthermore, the example embodiment performs well in high variation environments.

Figure 17:
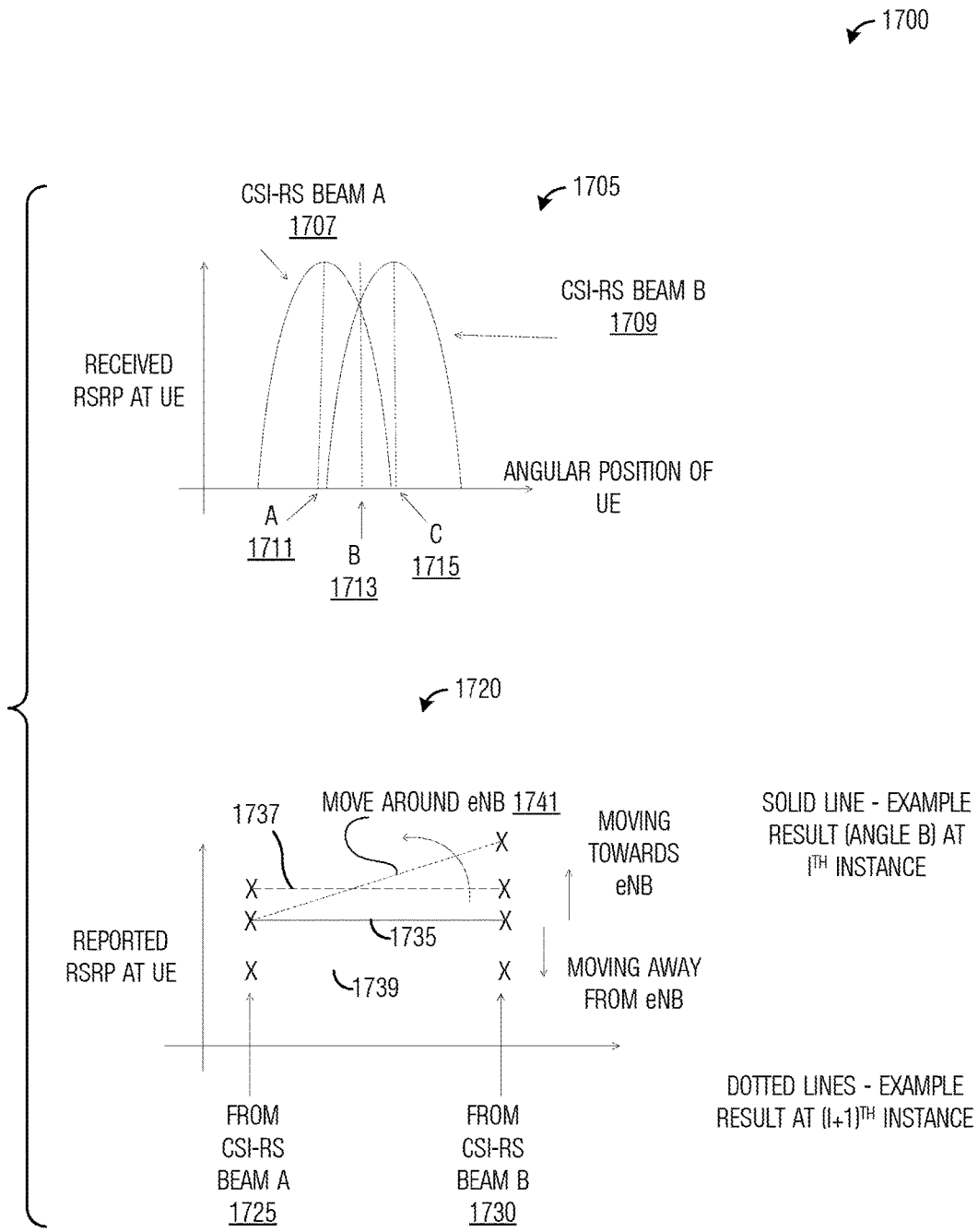
FIG. 17 illustrates a diagram illustrating mobility estimation from multiple feedback reports of multiple neighboring CSI-RS beams according to example embodiments described herein.

According to yet another example embodiment, the UE is configured to feedback CQI (or RSRP) for multiple (e.g., 2 or 3 or more) neighboring CSI-RS beams. The eNB may receive feedback reports for the multiple CSI-RS beams each reporting instance and compare results of the multiple reporting instances. FIG. 17 illustrates a diagram 1700 illustrating mobility estimation from multiple feedback reports of multiple neighboring CSI-RS beams. A first sub-figure 1705 illustrates CSI-RS beam A 1707 and CSR-RS beam B 1709, as well as a position of a UE as it moves from position A 1711, to position B 1713, and position C 1715 relative to the two CSI-RS beams. The UE may make measurements of CSI-RS beam A 1707 and CSI-RS beam B 1709 while it is at each one of the three positions and report the measurements back to an eNB. Second sub-figure 1720 illustrates reported RSRP of CSI-RS beam A 1707 and CSI-RS beam B 1709 as received by the eNB. A first line (solid line) 1735 may represent RSRP measurements of the two CSI-RS beams at a first instance of time when the UE is at position B as shown on sub-figure 1705. A second line (dashed line) 1737 may represent RSRP measurements of the two CSI-RS beams at a second instance of time as the UE moves in towards the eNB. A third line (dashed line) 1739 may represent RSRP measurements of the two CSI-RS beams at a second instance of time as the UE moves out away from the eNB. A fourth line (dotted line) 1741 may represent RSRP measurements of the two CSI-RS beams at a second instance of time as the UE move around the eNB (while keep a radial distance constant) from position B to position C.

According to yet another example embodiment, mobility estimation is performed using a combination of any of the above discussed example embodiments.

Figure 18:
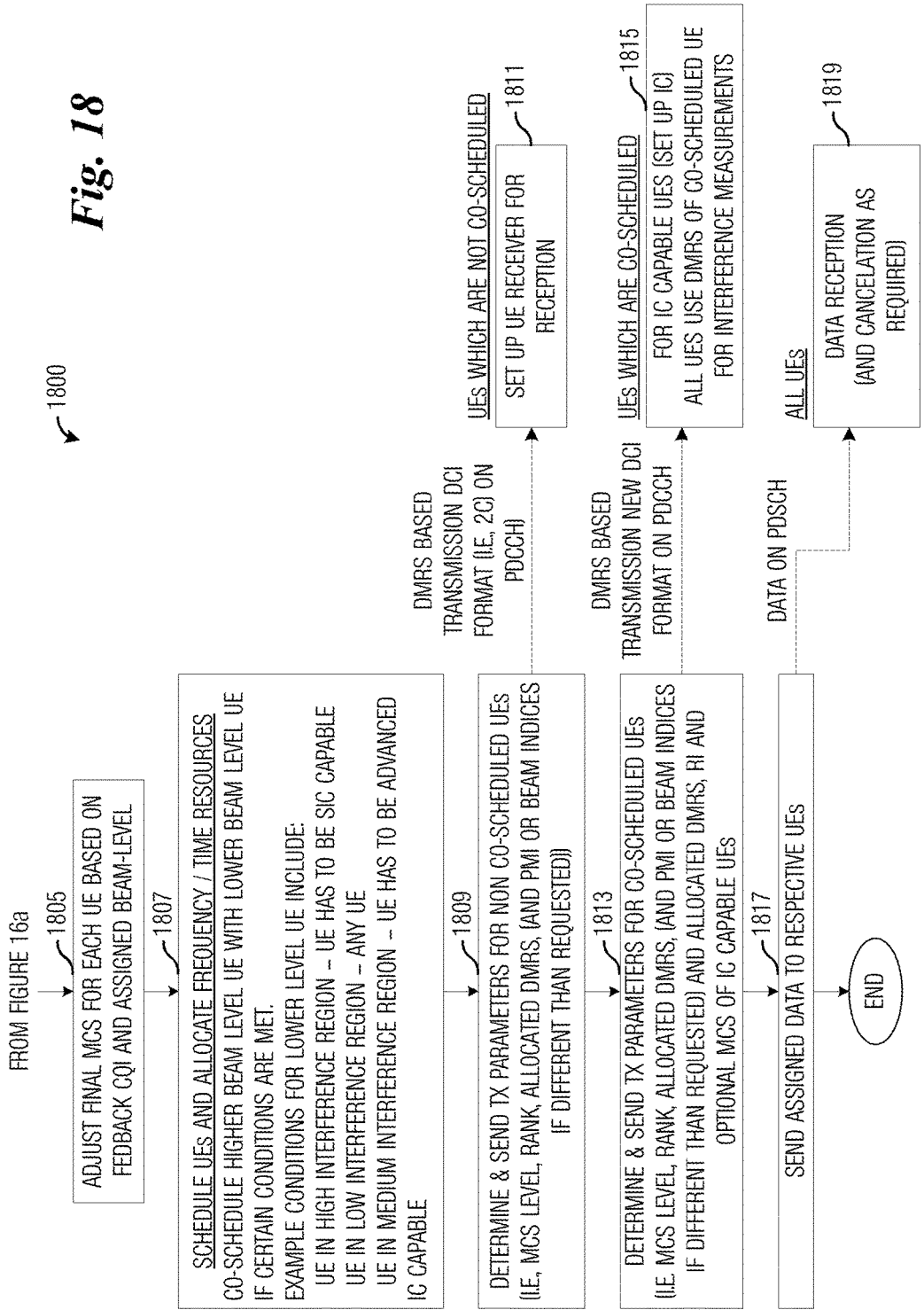
FIG. 18 illustrates a flow diagram of alternative example operations occurring during MLB-NOMA communications according to example embodiments described herein.

FIG. 18 illustrates a flow diagram of alternative example operations 1800 occurring during MLB-NOMA communications. Operations 1800 may be indicative of operations occurring in an eNB and UEs participating in MLB-NOMA communications and may be an alternative to operations 1629-1643 shown in FIG. 16*b*.

Operations 1800 may begin with the eNB adjusting a MCS for each UE (block 1805). The adjustment of the MCS for each UE may be in accordance with the CSI-RS feedback, as well as the assigned transmission beam(s). Since the CSI-RS feedback is based on beamformed CSI-RS, the eNB may need to adjust the MCS depending on the assigned transmission beam(s).

The eNB may schedule UEs (block 1807). The eNB may also allocate communications system resources. The eNB may schedule UEs based on scheduling criteria, including but not limited to presence of data for the UEs, buffer status of the UEs, priority of the UEs, service history of the UEs, QoS requirements of the UEs, communications system condition and/or traffic load, position of the UEs, mobility of the UEs, number of UEs, and the like. The eNB may co-schedule a higher level UE (a faraway UE) with a lower level UE (a close UE or high mobility UE) if co-scheduling conditions are met. Examples of conditions to co-schedule lower level UEs with higher level UEs may include: a) a lower level UE operating is in a high interference region of the higher level UE and the lower level UE is SIC capable; b) any lower level UE is in a low interference region of the higher level UE; and c) a UE is in a medium interference region of the higher level UE and the lower level UE is advanced IC capable. An example of a co-scheduling condition for higher level UE may be any UE that is at or near the edge of the coverage area of the eNB.

The eNB may determine and send transmission parameters for non-co-schedule UEs (block 1809). The eNB may select MCS level, rank (RI), allocated DMRS resources, (as well as PMI and/or beam index (indices)) if different than requested), and the like. The transmission of the DMRS may occur as specified in a DCI format, such as format 2C on a physical downlink control channel (PDCCH), for example. The UEs that are not co-scheduled do not require IC. The UEs that are not co-scheduled may set up their receivers for reception (block 1811).

The eNB may determine and send transmission parameters for co-scheduled UEs (block 1813). The eNB may select and transmit the MCS level, RI, allocated DMRS, (as well as PMI and/or beam index (indices)) if different than requested), and the like to each UE. The eNB may also send DMRS, RI, and MCS parameters of the other co-scheduled UEs to each UE in this group. The transmission of these parameters (DMRS, RI, MCS, etc.) may occur based on a new DCI format on the PDCCH. If the co-scheduled UEs have IC capability, these UEs will use the transmission parameters of the co-schedules UEs for setting up the IC receiver for reception (block 1815). Since all co-scheduled UEs (even if they do not perform IC) receive parameters of the other co-scheduled users, all of these users can perform interference measurements of the other co-scheduled user. Such Interference measurements can be feedback to the eNB at the next CQI feedback opportunity and enable a mechanism to optimize the co-scheduling of users when non-code book transmission is used, where normally only an estimate of the interference levels of co-scheduled can known in advance.

The eNB may send data to the scheduled UEs (block 1817). The sending of the data may be in accordance with the allocated communications system resources, as well as the transmission parameters. The data may be sent on a physical downlink shared channel (PDSCH). The scheduled UEs may perform data reception (as well as IC for those so scheduled) (block 1819). The sending of data and the receiving of data may be examples of the eNB and the UE communicating with each other.

FIG. 19 is a block diagram of a processing system 1900 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit 1905 equipped with one or more input/output devices, such as a human interface 1915 (including speaker, microphone, mouse, touchscreen, keypad, keyboard, printer, and the like), display 1910, and so on. The processing unit may include a central processing unit (CPU) 1920, memory 1925, a mass storage device 1930, a video adapter 1935, and an I/O interface 1940 connected to a bus 1945.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface such as Universal Serial Bus (USB) (not shown) may be used to provide an interface for a printer.

The processing unit also includes one or more network interfaces 1950, which may comprise wired links, such as an Ethernet cable or the like, and/or wireless links to access nodes or different networks 1955. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

Although the present disclosure and its advantages have been described in detail, it should be understood that various changes, substitutions and alterations can be made herein without departing from the spirit and scope of the disclosure as defined by the appended claims.

What is claimed is:

1. A method for operating a communications controller, the method comprising:
    serving, by the communications controller, a plurality of user equipments (UEs);
    grouping, by the communications controller, the plurality of UEs based on communication with the plurality of UEs into at least two beamforming configuration groups;
    selecting, by the communications controller, a first and second UE out of the plurality of UEs;
    allocating, by the communications controller, a wide width beam to the first UE and a narrow width beam to the second UE, and the wide width beam and the narrow width beam overlap;
    co-scheduling, by the communications controller, resources of a first transmit block to the first UE and the second UE;
    determining, by the communications controller, first transmission parameters for the first UE and second transmission parameters for the second UE in accordance with the co-scheduled resources;
    communicating, by the communications controller, with the first UE and the second UE in accordance with the first transmission parameters for the first UE and the second transmission parameters for the second UE;
    receiving a mobility estimate from the plurality of UEs; and
    regrouping the plurality of UEs in accordance with the mobility estimate.

2. The method of claim 1, further comprising:
    selecting a third UE out of the plurality of UEs;
    scheduling a resource of a second transmission block to the third UE;
    determining second transmission parameters for the third UE in accordance with the scheduled resource; and
    communicating with the third UE in accordance with the second transmission parameters.

3. The method of claim 1, further comprising:
    receiving the channel condition reports generated from measurements of a plurality of beamformed channel state information reference signal (CSI-RS).

4. The method of claim 1, further comprising:
    beamforming a (CSI-RS) with each of a plurality of transmission beams, thereby producing a plurality of beamformed CSI-RS;
    transmitting the plurality of beamformed CSI-RS; and
    receiving the channel condition reports.

5. The method of claim 4, further comprising:
    receiving feedback information associated with at least 2 adjacent beamformed CSI-RS;
    generating a mobility estimate for the first UE in accordance with the at least 2 beamformed CSI-RS; and
    regrouping the plurality of UEs in accordance with the mobility estimate.

6. The method of claim 4, further comprising:
    receiving feedback information associated with at least 2 beamformed CSI-RS, wherein the at least 2 beamformed CSI-RS are received at one of different transmit time intervals and at different frequencies;
    generating a mobility estimate for the first UE in accordance with the at least 2 beamformed CSI-RS; and
    regrouping the plurality of UEs in accordance with the mobility estimate.

7. The method of claim 4, further comprising:
    receiving feedback information associated with a beamformed CSI-RS;
    generating a mobility estimate for the first UE in accordance with the beamformed CSI-RS; and
    regrouping the plurality of UEs in accordance with the mobility estimate.

8. The method of claim 1, further comprising:
    receiving the UE IC capability reports from the plurality of UEs.

9. The method of claim 1, wherein communicating with the first UE and the second UE comprises:
    beamforming a first data for the first UE in accordance with the first transmission parameters for the first UE, thereby producing a first beamformed signal;
    beamforming a second data for the second UE in accordance with the second transmission parameters for the second UE, thereby producing a second beamformed signal; and
    transmitting the first beamformed signal and the second beamformed signal.

10. The method of claim 9, wherein communicating with the first UE and the second UE further comprises:
    including a first demodulation reference signal (DMRS) in the first beamformed signal; and
    including a second DMRS in the second beamformed signal.

11. The method of claim 9, wherein communicating with the first UE and the second UE further comprises:
    precoding the first data prior to beamforming the first data; and
    precoding the second data prior to beamforming the second data.

12. The method of claim 1, wherein the first transmission parameters comprises a DMRS allocated to the first UE.

13. The method of claim 12, wherein the first transmission parameters further comprises at least one of a modulation and coding scheme (MCS) level for the first UE and a rank indicator (RI) for the first UE.

14. The method of claim 12, wherein the first transmission parameters further comprises a DMRS allocated for the second UE.

15. The method of claim 14, wherein the first transmission parameters further comprises one of a modulation level for the second UE, a MCS level for the second UE, and a RI for the second UE.

16. A communications controller comprising:
    a processor; and
    a memory storing programming for execution by the processor, the programming including instructions to:
        serve a plurality of user equipments (UEs);
        group the plurality of UEs based on communication with the plurality of UEs into at least two beamforming configuration groups; select a first and second UE out of the plurality of UEs; allocate a wide width beam to the first UE and a narrow width beam to the second UE, the wide width beam and the narrow width beam overlap;

co-schedule resources of a first transmit block to the first UE and the second UE, determine first transmission parameters for the first UE and second transmission parameters for the second UE in accordance with the co-scheduled resources, communicate with the first UE and the second UE in accordance with the first transmission parameters for the first UE and the second transmission parameters for the second UE;

receive a mobility estimate from the plurality of UEs; and regroup the plurality of UEs in accordance with the mobility estimate.

17. The communications controller of claim 16, wherein the programming includes instructions to beamform a channel state information reference signal (CSI-RS) with each of a plurality of transmission beams, thereby producing a plurality of beamformed CSI-RS, transmitting the plurality of beamformed CSI-RS, and receive the channel condition reports.

18. The communications controller of claim 17, wherein the programming includes instructions to receive feedback information associated with at least 2 beamformed CSI-RS, generate a mobility estimate for the first UE in accordance with the at least 2 beamformed CSI-RS, and regroup the plurality of UEs in accordance with the mobility estimate.

19. The communications controller of claim 16, wherein the programming includes instructions to beamform a first data for the first UE in accordance with the first transmission parameters for the first UE, thereby producing a first beamformed signal, beamform a second data for the second UE in accordance with the first transmission parameters for the second UE, thereby producing a second beamformed signal, and transmit the first beamformed signal and the second beamformed signal.

20. The communications controller of claim 19, wherein the programming includes instructions to include a first demodulation reference signal (DMRS) in the first beamformed data, and include a second DMRS in the second beamformed data.

21. The communications controller of claim 20, wherein the programming includes instructions to precode the first data prior to beamforming the first data, and precode the second data prior to beamforming the second data.

22. The communications controller of claim 16, wherein the communications controller is one of an evolved NodeB (eNB), a base station, and a transmission point.

* * * * *